US008606717B2

(12) United States Patent
Gross

(10) Patent No.: US 8,606,717 B2
(45) Date of Patent: Dec. 10, 2013

(54) PLAYABLE MEDIA DELIVERY CAPACITY EXCHANGE METHOD

(75) Inventor: John Nicholas Gross, San Franicsco, CA (US)

(73) Assignee: Media Queue, LLC, Tulsa, OK (US)

( * ) Notice: Subject to any disclaimer, the term of this patent is extended or adjusted under 35 U.S.C. 154(b) by 2545 days.

(21) Appl. No.: 11/456,503

(22) Filed: Jul. 10, 2006

(65) Prior Publication Data

US 2006/0241967 A1    Oct. 26, 2006

Related U.S. Application Data

(63) Continuation of application No. 10/770,742, filed on Feb. 2, 2004.

(60) Provisional application No. 60/443,940, filed on Jan. 31, 2003.

(51) Int. Cl.
  *G06F 21/00* (2013.01)
  *G06F 15/173* (2006.01)

(52) U.S. Cl.
  USPC .......................................... 705/51; 709/224

(58) Field of Classification Search
  USPC ............................................................ 705/51
  See application file for complete search history.

(56) References Cited

U.S. PATENT DOCUMENTS

| | | |
|---|---|---|
| 4,766,542 A | 8/1988 | Pilarczyk |
| 5,095,195 A | 3/1992 | Harman et al. |
| 5,483,278 A | 1/1996 | Strubbe et al. |
| 5,579,384 A | 11/1996 | Seymour |
| 5,664,110 A | 9/1997 | Green et al. |
| 5,699,526 A | 12/1997 | Siefert |
| 5,742,757 A | 4/1998 | Hamadani et al. |
| 5,752,160 A | 5/1998 | Dunn |
| 5,790,426 A | 8/1998 | Robinson |
| 5,842,199 A | 11/1998 | Miller et al. |
| 5,861,906 A | 1/1999 | Dunn et al. |
| 5,884,282 A | 3/1999 | Robinson |
| 5,901,246 A | 5/1999 | Hoffberg et al. |
| 5,918,014 A | 6/1999 | Robinson |
| 5,918,213 A | 6/1999 | Bernard et al. |
| 5,945,987 A | 8/1999 | Dunn |
| 5,951,643 A | 9/1999 | Shelton et al. |
| 5,959,945 A | 9/1999 | Kleiman |
| 5,991,791 A | 11/1999 | Siefert |

(Continued)

FOREIGN PATENT DOCUMENTS

| | | |
|---|---|---|
| EP | 0900424 | 10/1999 |
| JP | 2000036781 | 2/2000 |
| WO | 0137539 | 5/2001 |
| WO | 0146930 | 6/2001 |

OTHER PUBLICATIONS

Hastings, Reed et al., "Approach for Renting Content," U.S. Appl. No. 60/244,793, filed Oct. 31, 2000, 9 pages.

(Continued)

*Primary Examiner* — Charles C Agwumezie
(74) *Attorney, Agent, or Firm* — PatentBest; Andrew McAleavey

(57) ABSTRACT

A network based distribution system and method is disclosed for exchanging capacity between subscribers for distribution of playable media items, such as movies in a digital format. The system allows subscribers to exchange capacity directly between themselves, and/or to have such exchange performed automatically on their behalf.

24 Claims, 11 Drawing Sheets

(56) References Cited

U.S. PATENT DOCUMENTS

| | | | |
|---|---|---|---|
| 6,012,052 A | 1/2000 | Altschuler et al. | |
| 6,016,475 A | 1/2000 | Miller et al. | |
| 6,026,403 A | 2/2000 | Siefert | |
| 6,029,161 A | 2/2000 | Lang et al. | |
| 6,041,311 A | 3/2000 | Chislenko et al. | |
| 6,044,356 A * | 3/2000 | Murthy et al. | 705/7.25 |
| 6,049,777 A | 4/2000 | Sheena et al. | |
| 6,055,505 A | 4/2000 | Elston | |
| 6,065,042 A | 5/2000 | Reimer | |
| 6,067,562 A | 5/2000 | Goldman | |
| 6,092,049 A | 7/2000 | Chislenko et al. | |
| 6,105,006 A | 8/2000 | Davis et al. | |
| 6,105,021 A | 8/2000 | Berstis | |
| 6,108,493 A | 8/2000 | Miller et al. | |
| 6,112,186 A | 8/2000 | Bergh et al. | |
| 6,124,854 A | 9/2000 | Sartain et al. | |
| 6,169,997 B1 | 1/2001 | Papierniak et al. | |
| 6,236,985 B1 | 5/2001 | Aggarwal | |
| 6,237,022 B1 | 5/2001 | Bruck et al. | |
| 6,253,203 B1 | 6/2001 | O'Flaherty et al. | |
| 6,266,649 B1 | 7/2001 | Linden et al. | |
| 6,286,139 B1 | 9/2001 | Decinque | |
| 6,289,389 B1 | 9/2001 | Kikinis | |
| 6,308,168 B1 | 10/2001 | Dovich et al. | |
| 6,317,722 B1 | 11/2001 | Jacobi et al. | |
| 6,321,221 B1 | 11/2001 | Bieganski | |
| 6,334,127 B1 | 12/2001 | Bieganski et al. | |
| 6,370,513 B1 | 4/2002 | Kolawa et al. | |
| 6,381,250 B1 | 4/2002 | Jacobson et al. | |
| 6,389,372 B1 | 5/2002 | Glance et al. | |
| 6,405,191 B1 | 6/2002 | Bhatt et al. | |
| 6,412,012 B1 | 6/2002 | Bieganski et al. | |
| 6,418,424 B1 | 7/2002 | Hoffberg et al. | |
| 6,426,959 B1 | 7/2002 | Jacobson et al. | |
| 6,480,855 B1 | 11/2002 | Siefert | |
| 6,483,548 B1 | 11/2002 | Allport | |
| 6,484,123 B2 | 11/2002 | Srivastava | |
| 6,487,541 B1 | 11/2002 | Aggarwal et al. | |
| 6,496,816 B1 | 12/2002 | Thiesson et al. | |
| 6,502,096 B1 | 12/2002 | Siefert | |
| 6,513,017 B1 | 1/2003 | Howard et al. | |
| 6,539,281 B2 | 3/2003 | Wan et al. | |
| 6,564,047 B1 | 5/2003 | Steele et al. | |
| 6,591,094 B1 | 7/2003 | Bentley | |
| 6,658,390 B1 | 12/2003 | Walker et al. | |
| 6,714,931 B1 | 3/2004 | Papierniak et al. | |
| 6,735,778 B2 | 5/2004 | Khoo et al. | |
| 6,826,560 B1 | 11/2004 | Leymann et al. | |
| 6,847,938 B1 | 1/2005 | Moore | |
| 6,874,023 B1 | 3/2005 | Pennell et al. | |
| 6,910,070 B1 | 6/2005 | Mishra et al. | |
| 6,965,770 B2 | 11/2005 | Walsh et al. | |
| 6,981,003 B2 | 12/2005 | Pauliks et al. | |
| 7,024,381 B1 * | 4/2006 | Hastings et al. | 705/27.1 |
| 7,085,727 B2 | 8/2006 | VanOrman | |
| 7,130,814 B1 | 10/2006 | Szabo et al. | |
| 7,403,910 B1 | 7/2008 | Hastings et al. | |
| 7,603,285 B2 | 10/2009 | Jacobs et al. | |
| 7,640,180 B1 * | 12/2009 | Slocum et al. | 705/7.25 |
| 2001/0014145 A1 | 8/2001 | Kamel et al. | |
| 2001/0036271 A1 | 11/2001 | Javed | |
| 2002/0046129 A1 | 4/2002 | Nakagawa | |
| 2002/0049717 A1 | 4/2002 | Routtenberg et al. | |
| 2002/0058496 A1 | 5/2002 | Bos et al. | |
| 2002/0143661 A1 | 10/2002 | Tumulty et al. | |
| 2002/0154157 A1* | 10/2002 | Sherr et al. | 345/716 |
| 2002/0156715 A1 | 10/2002 | Wall et al. | |
| 2002/0184105 A1 | 12/2002 | Czuchry et al. | |
| 2003/0005428 A1 | 1/2003 | Roman | |
| 2003/0023743 A1 | 1/2003 | Raphel et al. | |
| 2003/0066093 A1 | 4/2003 | Cruz-Rivera et al. | |
| 2003/0078983 A1 | 4/2003 | Sullivan et al. | |
| 2003/0083951 A1 | 5/2003 | Connelly | |
| 2003/0131355 A1 | 7/2003 | Berenson et al. | |
| 2003/0233278 A1 | 12/2003 | Marshall | |
| 2004/0002938 A1* | 1/2004 | Deguchi | 707/1 |
| 2004/0215733 A1 | 10/2004 | Gondhalekar et al. | |
| 2004/0220826 A1 | 11/2004 | Hey | |
| 2004/0242208 A1 | 12/2004 | Teicher | |
| 2005/0086127 A1 | 4/2005 | Hastings et al. | |
| 2006/0031551 A1 | 2/2006 | Agresta et al. | |
| 2006/0218054 A1 | 9/2006 | Postelnik et al. | |
| 2009/0307348 A1* | 12/2009 | O'Neal et al. | 709/224 |
| 2010/0162408 A1* | 6/2010 | Roever et al. | 726/26 |

OTHER PUBLICATIONS

Ciancutti, John et al., "Approach for Choosing Items to Recommend Based Upon Matching Taste Across Multiple Users and Items," U.S. Appl. No. 60/212,193, filed Jun. 16, 2000, 15 pages.

Fields, David; "Volunteers for bumps fare better airlines have to pay only $400, but that may change," USA Today, Mar. 6, 2001, p. B.07.

Anonymous, "Make your wish list and check it twice," PR Newswire, Oct. 30, 2001, 2 pages.

Ling, S., et al., "Using Two Object-Oriented Modelling Techniques: Specifying the Just-in-Time Kanban System," International Journal of Operations and Production Management, vol. 15, No. 9, pp. 185-199, 1995.

Anon., "Netflix IPO Tops Expectations, Stock's Debut Dazzles," Newsbytes News Network, May 24, 2002.

Anon., "Apple Announces iTunes 3; Now with Revolutionary Smart Playlists, Audible.com & Sound Check," M2 Presswire, Jul. 18, 2002.

Netflix Freak 1.0, www.versiontracker.com, 1 page, software release date of Dec. 3, 2003.

www.dvdrentalsystem.com, 10 pages, date unknown.

Final Office Action for U.S. Appl. No. 10/770,937, mailed Jul. 11, 2007, 26 pages.

Amendment and Response A for U.S. Appl. No. 10/770,937, filed via EFS Apr. 11, 2007, 12 pages.

Paula Eisenberg; "A Better Way to Get Your DVD Fix," Larchmont Gazette, Aug. 23, 2002, 3 pages.

Michael Gunde, et al.; "Southern Conference of Librarians for the Blind and Physically Handicapped," DIKTA, vol. XIII, No. 2, 1991, 8 pages.

Anonymous; "Beyond 2000: Books, Bytes and Beginnings," Agency Strategic Plan Fiscal Years 2001-2005, Texas State Library and Archives Commission, http://web.archive.org/webl200112170410 16/www.ts1.state.tx.ns/pubs/st., 2001, 46 pages.

Dale Propp; "Access Self-Study, Texas State Library," vol. 7, Dec. 15, 1987, 14 pages.

Judith Wanger, et al.; "Automated Circulation Systems in Libraries Serving the Blind and Physically Handicapped: A Reference Guide for Planning," Cuadra Associates, Inc., May 15, 1981, 292 pages.

Anonymous; "New York State Talking Book and Braille Library," http://web.archive.org/web/2002081720 1412/www.nysl.nysed.gov/tbblit, 2002, 13 pages.

Jean D. Anderson; "The New York State Library for the Blind and Visually Handicapped Automated Circulation System," The University of the State of New York, 1978, 42 pages.

Susie Adams, et al.; "BizTalk Unleashed," Sams Publishing, 2002, 5 pages.

Anonymous; "MAINTSTAR: Software that makes asset management and maintenance simple," www.maintstar.com, Undated, 20 pages.

Peter Konshak; "Coding a Custom Alert Service," Computers in Libraries, Feb. 2001, 4 pages.

Anonymous; "E-Commerce Inventory Management System Offers Unprecedented Solution for Cost Savings," Business Wire, Jul. 20, 2000, 2 pages.

Gregory Wasson; "PowerAGENT," MacUser, Feb. 1, 1995, 2 pages.

John Webster; "Soap May Help Automate B2B," InternetWeek, Jan. 15, 2001, 2 pages.

Martin Skold; "Active Database Management Systems for Monitoring and Control," Linkoping Studies in Science and Technology Dissertation No. 494, 1997, 312 pages.

(56) References Cited

OTHER PUBLICATIONS

David W. McKeown, et al.; "Triggers for object-oriented database systems," Journal of Object-Oriented Programming, May 1997, 8 pages.
John R. Miller, et al.; "Automating Residence Hall Internet Signups," SIGUCCS 2000, 5 pages.
Eric N. Hanson, et al.; "A flexible and recoverable client/server database event notification system," The VLDB Journal (1998) 7: 12~24.
Bill Dedman; "E-Mail Alerts Show Growing Potential," NY Times, Feb. 9, 1998, 2 pages.
Anonymous; "INCOMNET launches new Euro-style prepaid calling card," Business Wire, Oct. 15, 2003, 2 pages.
Anonymous; "Libraries & Literacy Libraries consider needs of community," the Globe and Mail (Canada), Jun. 4, 1993. 2 pages.
Eric N. Hanson; "Support of Intelligent Integration of Information Using an Asynchronous Trigger Processor," AFRL-IF-RS-TR-2000-72 Final Technical Report, Jun. 2000, 57 pages.
Anonymous; "Georgia Regional Library for the Blind & Physically Handicapped," http://web.archive.org/web120010603032749/www.public.lib.ga.us/lbph/, 1997, 7 pages.
Anonymous; "The Andrew Heiskell Library for the Blind and Physically Handicapped," http://web.archive.oqifweb/20020804061148/1bIpac.nypl.org/ cgi -bin/we, 2002.
Anonymous; "Siebel 7.5 Integration BMC Software Patrol for Siebel eBusiness Applications 3.0," Siebel Systems, Inc., 2002, 2 pages.
Current Press Releases, "Online Rental Service Netflix Surpasses 600,000 Subscribers," http://www.netflix.com, Apr. 23, 2002, 1 page.
Current Press Releases, "Boost in Holiday DVD Sales Pushes Netflix Over 500,000-Subscribers," http://www.netflix.com, Feb. 12, 2002, 2 pages.
Current Press Releases; "It's a 'Winter-ful' Life With Movies in Your Mailbox," http://www.netflix.com, Jan. 8, 2002, 2 pages.
Current Press Releases; "Netflix launches 'all you can watch' DVD rental program," http://www.netflix.com, Feb. 14, 2000, 2 pages.
Marc Matsumoto.; Miscellaneous emails regarding Netflix, dated Jul. 7, 2002, 9 pages.
Netflix Media Center; "Netflix.com Transforms DVD Business Eliminating Late Fees and Due Dates From Movie Rentals," http://netflix.mediaroomcom/index.php?s=43&itelIF231, Dec. 16, 1999, 2 pages.
Arlene Weintraub; "Netflix' Pix Beat Mortar and Bricks," Business Week, May 16, 2002, 2 pages.
Benny Evangelista; "Movies by mail Netflix.com makes renting DVDs easy," SFGate.com, Jan. 26, 2002, 3 pages.
Sean Popen; "We've Received: EastNVest (2000)—Rate It Now!," email dated May 21, 2001, 1 page.
Marc Matsumoto, et al.; Miscellaneous emails regarding Netflix, dated Jul. 6-8, 2002, 169 pages.
Google Groups; "Nine Queens not playable on Toshiba . . . any others?," http://groups.google.com/group/alt.video.dvdlbrowse_thread/threadl191212068d27f9fb?.., Nov. 18-23, 2002, 3 pages.
Google Groups; "Netflix—Strange message," http://groups.google.com/group/alt.video.dvd/browse_thread/thread/c6fe274e039aa9f8?h., Apr. 18, 2000, 1 page.
Sean Popen; "Shipped: Dragonheart: A New Beginning (2000)," email dated May 24, 2001, 1 page.
Declaration of Neil D. Hunt, dated Mar. 16, 2007, Los Gatos, California, 11 pages.
Final Office Action for U.S. Appl. No. 10/771,049 mailed Sep. 20, 2007, 25 pages.
Information Disclosure Statement filed for U.S. Appl. No. 10/771,049, Jun. 7, 2007, 14 pages.
Order Granting/Denying Request for Inter Partes Reexamination for U.S. Patent 7,389,243, Control No. 95/000,469, mailed Dec. 1, 2009, 25 pages.
Schwartz, S.K.: CD Clubs: a sound deal? located at <http://money.cnn.conn/1999/12/01/life/q_music/>, Dec. 1, 1999, 5 pages.
Bellman, S. et al., "To Opt-in to Opt-out? It Depends on the Question," Communications of the ACM 44(2):25-27, Feb. 2001, 5 pages.
eBay Auction Watch version 1.0.4—Nov. 2, 2000, 2 pages.
Auction Sniper—Oct. 14, 2002, 2 pages.
Register with Auction Sniper—Oct. 14, 2002, 2 pages.
Sniping the AuctionSniper Way—Oct. 14, 2002, 4 pages.

* cited by examiner

310 — To: John Doe
From: xxx Movie rentals          Q keeper ☺
Re: Notice

Dear customer,
This is a courtesy notice to inform you that:

320 — [1] Your shipping queue is empty or near empty; click here to see its status (have you considered this title:...?)

330 — [2] Per your request we are placing a new title in your queue for shipping.

The title is EEE (Click here for more details) and will be shipped automatically to you approximately _ day unless we've been otherwise notified.

335 — Let us know you rate our selection by clicking here: feedback

340 — If you wish to cancel this auto selection/ autoship item, please click here.

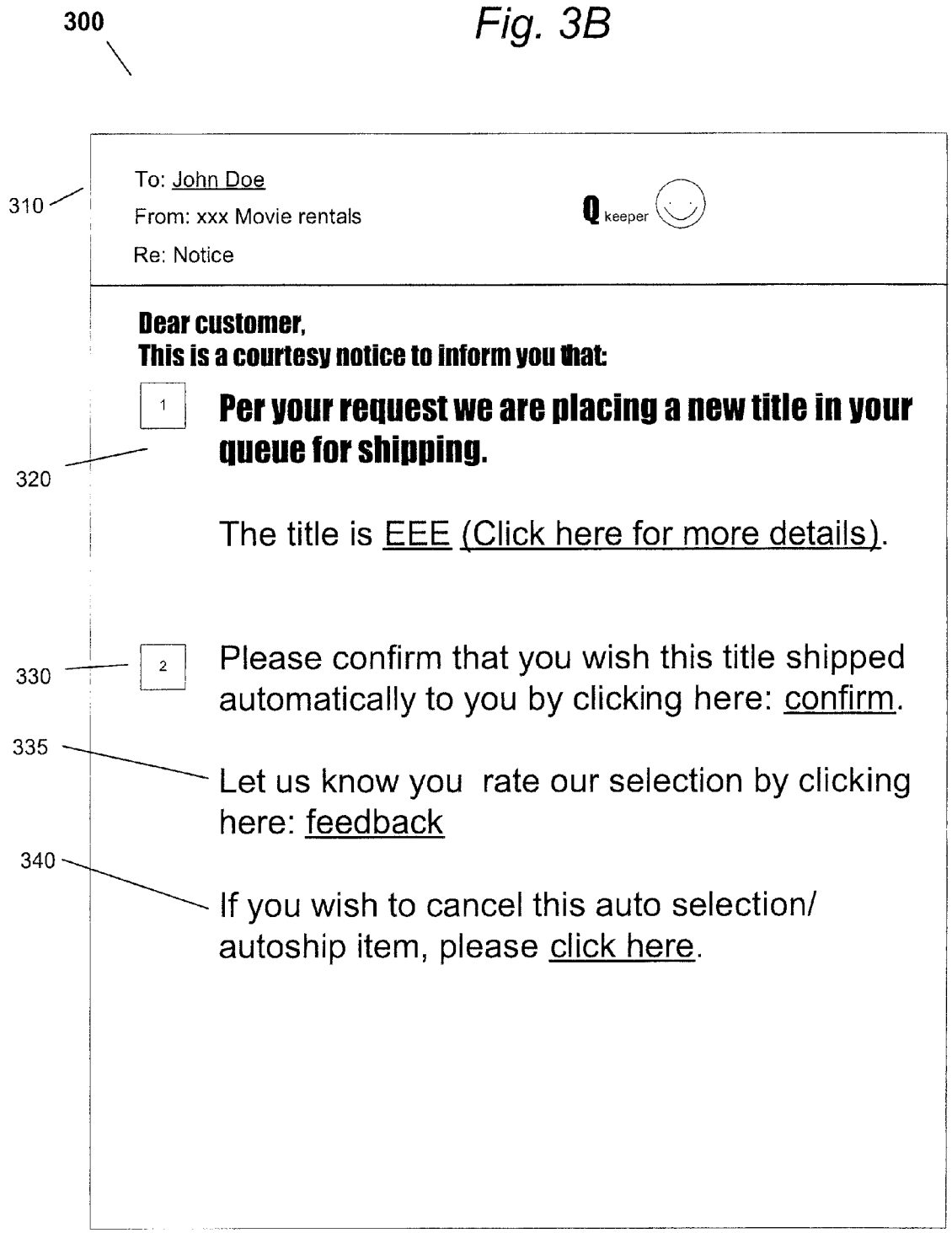

350

Notification confirmation

Here is the section we have made for you:

| Title | Description | Auto- select option |
|---|---|---|
| EEE | ------------ | Auto recommended by us based on your prior choices + rating |

☐ Go and ship
☐ Do not ship
☐ Do not ship

Finished/refund

Please rate your Q keeper!

(Feedback)

Auto- recommended survey for subcriber profiling

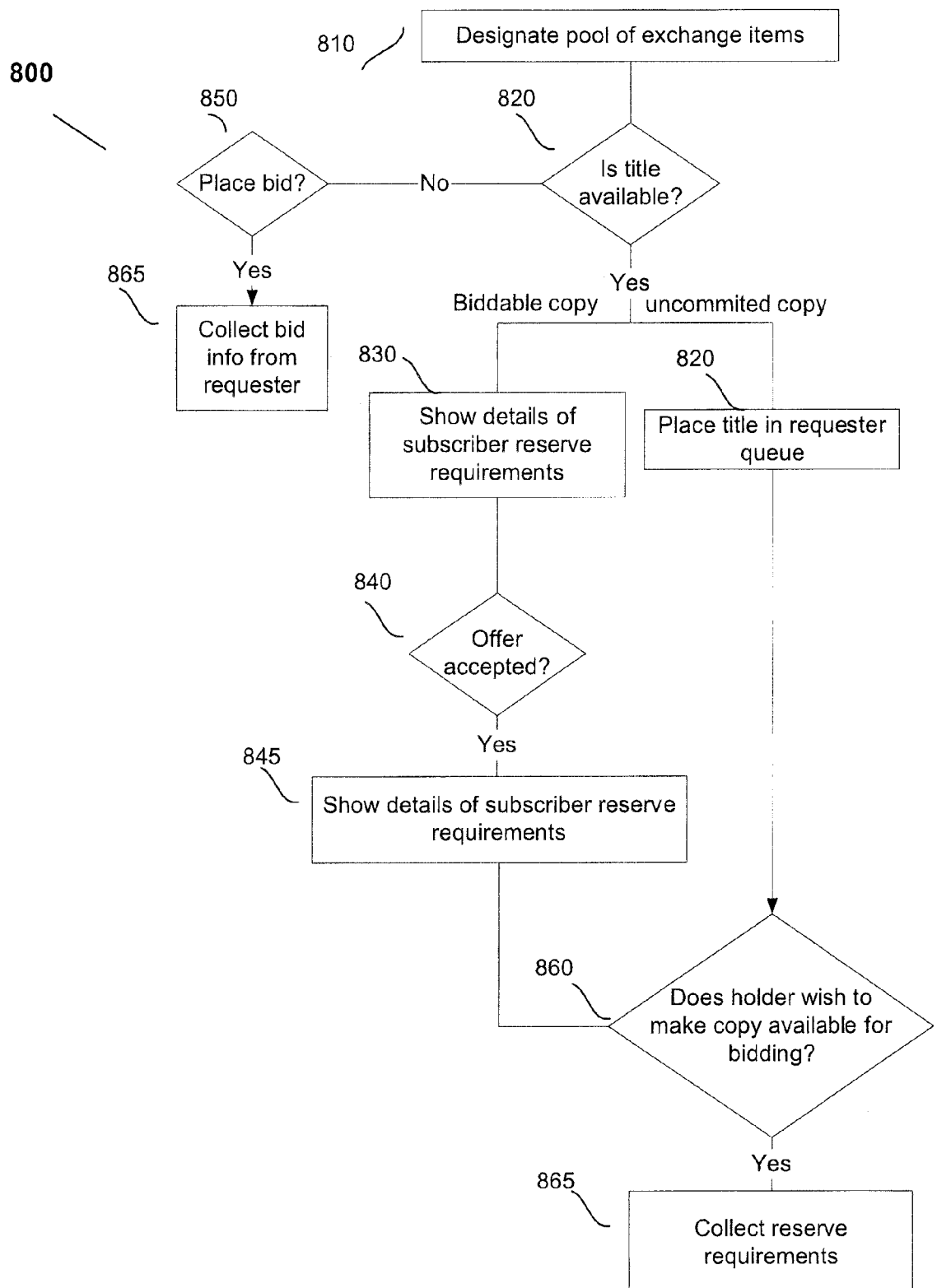
Fig 8 — Subscriber Based Exchange system operation

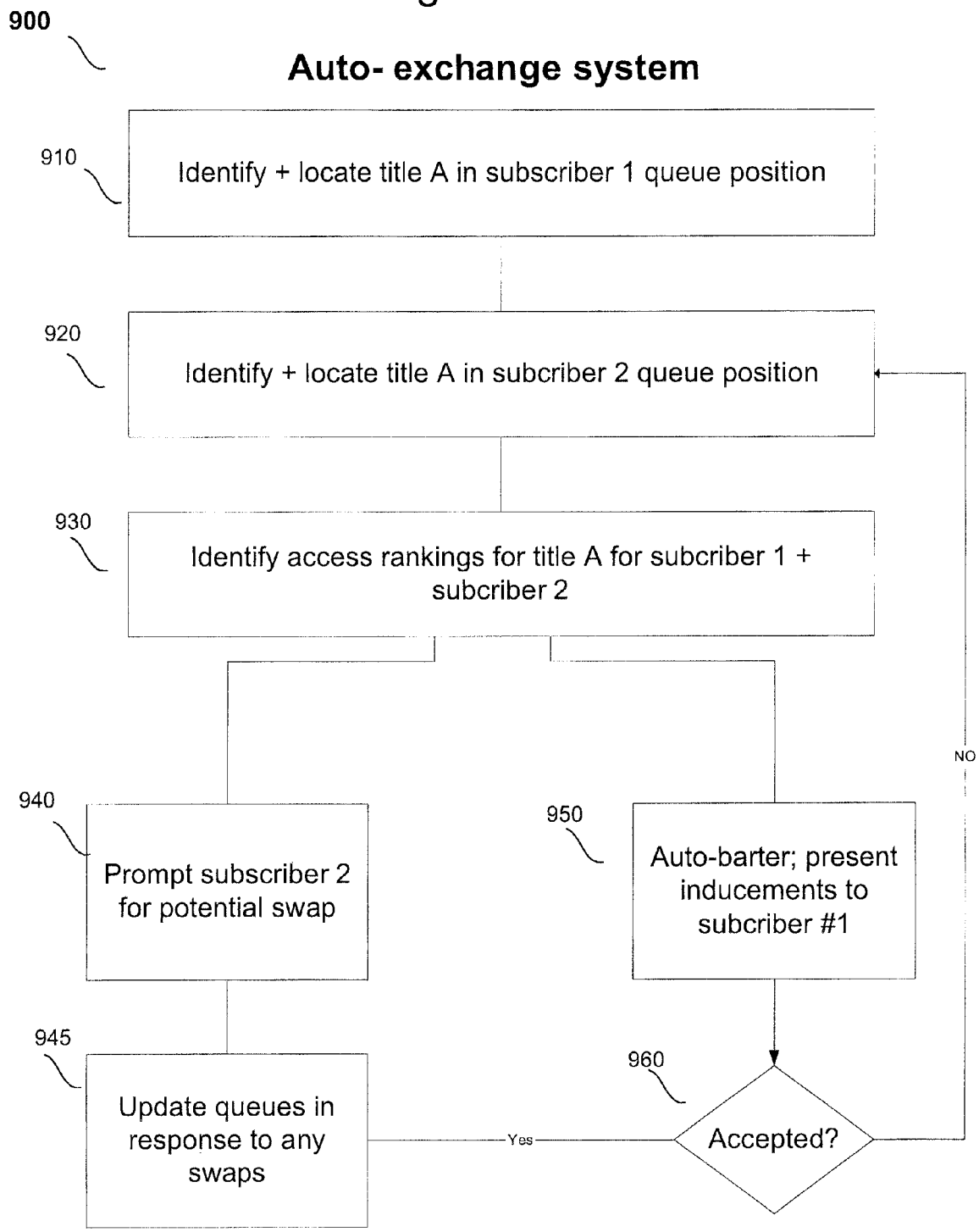

PLAYABLE MEDIA DELIVERY CAPACITY EXCHANGE METHOD

RELATED APPLICATION DATA

The present application claims priority to and is a continuation of Ser. No. 10/770,742 filed Feb. 2, 2004 and further claims the benefit under 35 U.S.C. 119(e) of the priority date of Provisional Application Ser. No. 60/443,940 filed Jan. 31, 2003, both of which are hereby incorporated by reference.

FIELD OF THE INVENTION

The present invention relates to electronic commerce systems and methods of providing automatic exchange mechanisms for items. The invention has particular applicability to applications in which entertainment media are rented on a temporary or short term basis by subscribers over the Internet.

BACKGROUND

The Internet is now being used for a number of commercial purposes, including purchase and rental of movie films in different media formats. One such popular website is maintained by Netflix®, where subscribers can search, review and select movie titles (in DVD media format). If a particular title is available, the subscriber's choice is then placed into a rental selection "queue." During an interactive online session, a subscriber can select a number of titles, and then prioritize them in a desired order for shipment within the selection queue.

During this same sessions, the system can also make recommendations for titles to a user using a well-known recommender algorithm. Such algorithms are commonplace in a number of Internet commerce environments, including at Amazon, CDNOW, and Netflix to name a few. While the details of such algorithms are often proprietary, the latter typically use a number of parameters for determining a user's movie "tastes" so to speak, including demographics, prior movie rentals, prior movie ratings, user navigation statistics, comparison with other users, etc.

After the movie title selection session is over, the system proceeds to ship the desired titles in the order requested by the subscriber. The selections are mailed to the user in special packaging, which include return mailers pre-printed and adapted for such movie media. This minimizes the inconvenience to the subscriber, but there is an indeterminate processing and mailing delay therefore associated with each selection. In most instances, a selection is mailed the same day, but even in such cases, there is typically a three day transaction period associated between the selection, processing, shipment, mail transit and receipt of a particular title.

After shipment, these titles then appear in a list identified essentially as items that are outstanding (i.e., movies that have not yet been returned by the user) within a "titles out" queue. Under the Netflix terms of service, the system places a limit on the number of outstanding titles that a subscriber may have at any one time (typically, a function of the level of service agreement, with more $$/month resulting in more titles). Thus, if the user selects more movies than they can acquire at one time, the remaining movie titles remain as un-shipped items in the rental selection queue. Additional titles in the rental selection queue are only shipped to the user after the system logs a returned item from that same user. This happens automatically, so the user does not need to return to the Netflix website to request the shipment.

A limitation of the aforementioned system is that while the system automatically ships the next items in the rental queue it fails to notify the subscriber when the rental queue is empty, near-empty, or perhaps contains less desirable selections than those that the user would otherwise select if they were aware of more recent available titles. This is undesirable because if the rental queue runs empty, the user is not made aware of the fact that no additional titles are forthcoming. By the time the user discovers that no new titles are in the rental queue, it is now no longer possible for the subscriber to receive a new title any earlier than the minimum delay period noted above (typically three days). This is clearly unattractive from the subscriber's perspective, especially since the latter typically pay a fixed fee per month for the benefits of the Netflix service. In other words, unless they constantly monitor their own rental queue to make sure it is stocked with selections for shipping, subscribers run the risk of being "title-less" for several days.

Aside from the lack of notification noted earlier, another limitation of the Netflix system is that it does not give subscribers any flexible degree of control over their rental selection queue or shipments. For example, subscribers are not given an option of whether a particular title in the rental queue should be shipped; it is automatically shipped, even if they may have changed their minds.

In addition, there is no barter or exchange available within such systems for subscribers. For example, some subscribers may wish a particular title, and others may have such title in a rental selection queue available for shipping. By permitting the subscribers to negotiate directly, demand could be satisfied through another dynamic. Similarly, there is no provision in such systems for identifying stock-out situations for particular subscribers; i.e. situations where a subscriber has a long wait associated with every entry in their rental queue. In such cases, the subscriber's business can be lost, simply because he/she is not receiving even a single title for several days or week. An automatic exchange system, therefore, is greatly needed in this instance, to reduce customer cancellations or defections.

Furthermore, subscribers cannot make optimal use of the recommender system employed in the Netflix system. In other words, while the latter provides recommendations of titles to users while they are online during a particular session, it does not perform any active monitoring of their selections after such time to see if a new selection is now available that may be desirable for consideration in (or automatic insertion into) their rental selection queue. This further means that the Netflix system does not provide any mechanism for monetizing such recommendations to subscribers. Subscribers are not likely to object to a small surcharge for specific rentals that are achieved by virtue of the help of an automatic queue monitoring/recommendation system, particularly when it would mean that they did not have to constantly monitor and update their rental queue.

Thus, from a fundamental perspective, the Netflix system (and other prior art systems like it) do not permit any significant user interaction, control or monitoring of selections presented in a rental queue. While the Netflix system has been operational for several years, the aforementioned limitations have not been appreciated or addressed, and thus remain a continuing problem. Accordingly, there is clearly a long-felt need to remedy the deficiencies of such system, and other systems which employ a type of "queue" for handling customer selections/shipments of products, including rental media.

SUMMARY OF THE INVENTION

An object of the present invention, therefore, is to overcome the aforementioned limitations of the prior art.

Another object is to implement an intelligent queue monitoring system that allows subscribers/purchasers to define policies and rules to be used in determining what actions should be taken with respect to particular items in such queue, and at what times;

A further object is to provide a notification system that alerts and informs subscribers/purchasers of the status of items in a rental/purchase queue;

A related object is to provide a feedback system that allows subscribers/purchasers to react and provide intelligent feedback in response to such notifications in a rental/purchase queue;

Still another object is to provide a recommender system that coordinates with a queue monitoring system, so that the subscribers/purchasers can enjoy the benefits of such system even during periods when they are not actively engaged with an online rental/purchase system;

Yet another object is to provide a monitoring system that imposes an optional surcharge to subscribers/purchasers when they avail themselves of recommendations generated and by an online rental/purchase system.

A further object is to provide a system for encouraging subscribers to given meaningful feedback to the quality of services provided by Internet based companies;

Another object is to provide an exchange system (and methods) to permit subscribers to offer, bid, negotiate and swap titles (and access rights, capacity) directly, to improve overall customer satisfaction and respond to demand through another subscriber-based capacity tool;

A further object is to provide an automatic exchange system (and methods) to identify situations in which it is beneficial to intervene directly and attempt to satisfy a subscriber's rental selection, such as by negotiating and swapping access rights to titles directly with inducements;

Still other objects are to provide associated related methods of implementing the aforementioned systems.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. While described in the context of a rental system, it will be apparent to those skilled in the art that the present teachings could be used in any Internet based rental or purchase system that employs a queue of some form.

DESCRIPTION OF THE DRAWINGS

FIG. 3A depicts an embodiment of a first type of email notification provided to a subscriber in accordance with the teachings of the present invention;

FIG. 3B depicts an embodiment of a second type of email notification provided to a subscriber in accordance with the teachings of the present invention;

FIG. 8 illustrates a process employed in a subscriber based media title exchange system in accordance with the teachings of the present invention;

FIG. 9 illustrates a process employed in an automatic media title exchange system in accordance with the teachings of the present invention.

DETAILED DESCRIPTION

Subscriber Queue Status Interface

Figure 1:
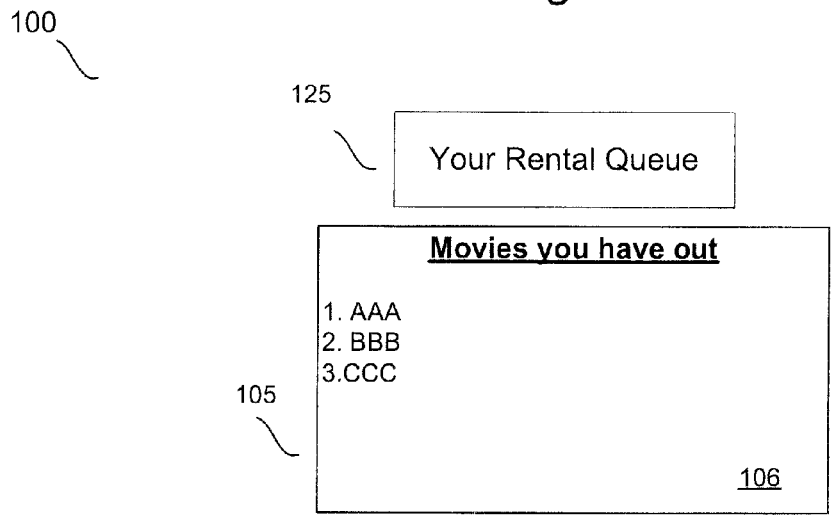
FIG. 1 is an illustration of a queue status interface employed in the present invention that is adapted for assisting users/subscribers to monitor the status of a rental queue.
Figure 1:
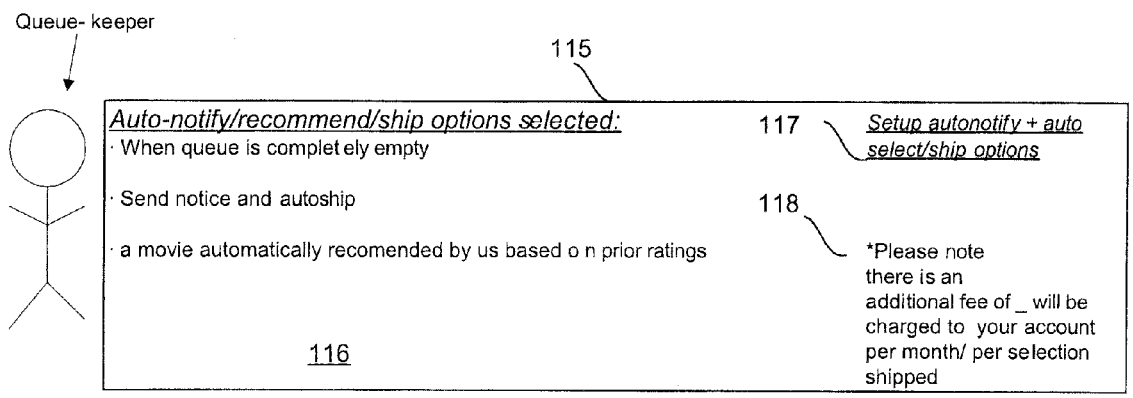

FIG. 1 illustrates an example of a queue status interface 100 employed in the present invention that is adapted for assisting users/subscribers to set up a queue monitoring system for monitoring the status of a rental queue for renting/purchasing playable media items, and specific set up controls for such monitoring. While the present preferred embodiment is directed to a rental service for distributing DVD movie titles, it will be understood by those skilled in the art that, as used herein, the term "media item" or "playable media item" is intended to have its broadest meaning to include any machine readable media readable (including software programs) by a subscriber machine player (such as a DVD player, a computer, a video recorder/receiver, an audio CD ROM Player, and the like). Furthermore, other queable content/items that are not machine readable could be distributed in this fashion as well, including human readable materials such as printed matter in the form of books, magazines, and other general purpose items. Other useful articles can be rented and distributed in accordance with the present teachings as well.

Figure 7:
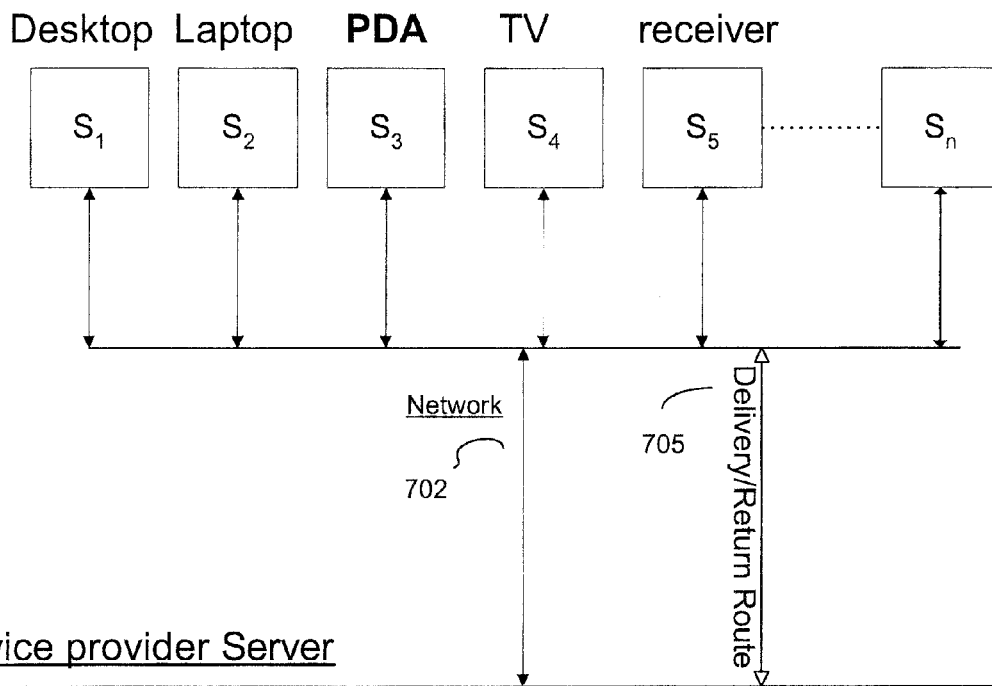
FIG. 7 illustrates an embodiment of a media distribution system that distributes media in accordance with the teachings of the present invention.
Figure 7:
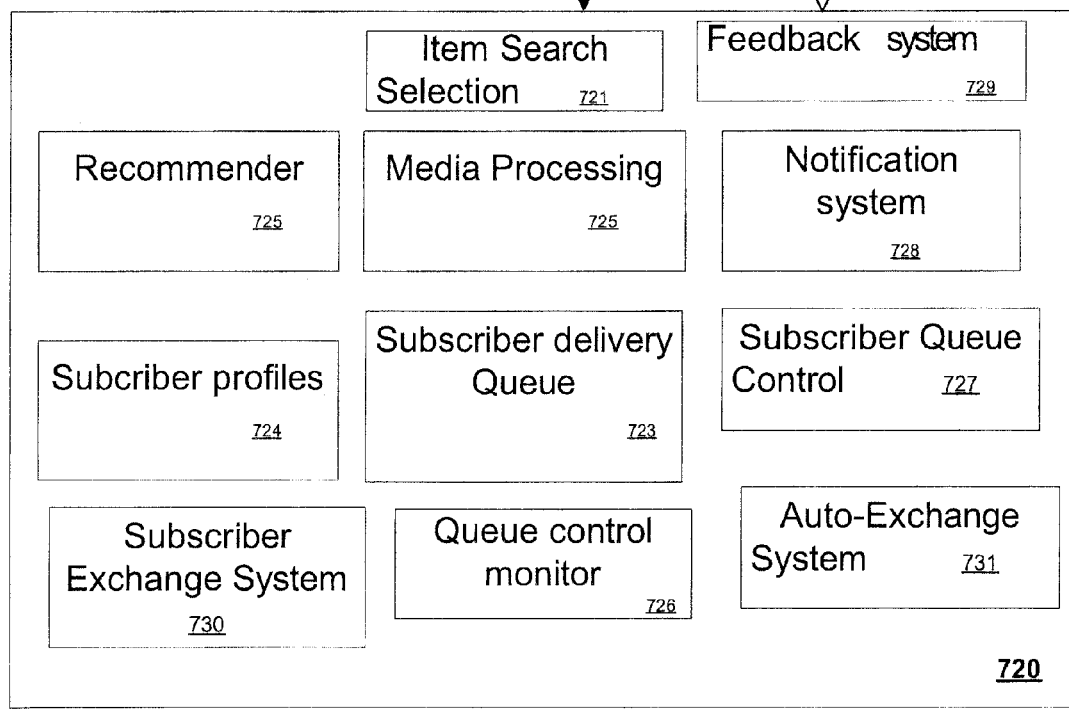

During an interactive session with a subscriber over a network (such as the Internet), queue status interface 100 is generated under control of a media distribution system (such as an Internet Server maintained by a media distribution provider as shown in FIG. 7) as a World Wide Web (WWW) web page and presented within a client device (i.e., some form of computing system) within a browser software program. The details of such servers, client devices, browsers, and WWW page codings are well known, and are not material to the present invention. Those skilled in the art will appreciate that any number of combinations of such elements will interoperate with the present invention.

As part of electronic interface 100, a number of viewable fields are presented to a user by a WWW page for visualizing media distribution information, which, in a preferred embodiment, are movie titles distributed in a DVD format. These include, in this instance three primary areas:

a first display area 105 depicting status of a Titles Out Queue 106;
a second display area 111 depicting status of a Subscriber Selection Queue 110;
a third display area 115 depicting what Queue Control Options 116 are in place;

an (optional) avatar FIG. 120 representing a "Queue Keeper" character to assist subscribers;

Other aspects of a WWW page commonly associated with such types of rental distribution systems (search engines, ads, administrative options, links to other related pages of the site) are not shown in FIG. 1 (or FIG. 2) so as to better emphasize the nature of the present invention. Thus, it will be understood, of course, that other items may be present and displayed within such page(s), including other URL tags, Java applets, etc. along with header 125.

As is apparent, Titles Out Queue 106 identifies a first list of movie titles (AAA, BBB, CCC) that are designated with a first deployment status, namely, that they are still "out" to the subscriber in an out queue. In other words, the subscriber still has these titles outstanding in his/her possession, or they are in transit (to or from the subscriber). This display area is formatted essentially the same as a prior art system described earlier. As noted earlier, in a typical fixed price rental service, the capacity of a Titles Out queue is typically fixed to some predetermined number, so that the subscriber cannot exceed this limit without additional authorization.

Second display area 110 identifies a second list of movie titles (DDD through HHH) in a Subscriber Selection Queue 116 that have a second deployment status, namely, that they have been selected by the subscriber but are still waiting to be distributed. Generally speaking these titles are to be distributed to the subscriber when space is made available in Titles Out queue 106 shown in first field 105—although other schemes are possible. Typically, in a prior art system, a movie title (such as entry 111) is moved from Subscriber Selection Queue 110 to the Titles Out Queue 106 when it is actually shipped (or otherwise distributed) to the subscriber. This in turn happens in response to the fact that one of the movies from the Titles Out queue 106 list is returned by the subscriber, or in some cases upon some other triggering event (such as the subscriber altering a subscription level). Unlike Titles Out queue 106, Subscriber Selection Queue 110 is usually not fixed to some predetermined capacity (but it can be if desired). Accordingly, a subscriber can load as many of his his/her preferences in advance as they desire.

In some instances a subscriber may in fact "overload" a Subscriber Selection Queue 116 because they have limited access opportunities to monitor their selections, or they simply do not wish to constantly monitor later for new selections that may be available.

Nonetheless, this situation is not optimal, because subscribers are often forced to select what can be described as essentially second rate (or even third rate selections) during a particular session/visit, simply because they do not have time to visit the site at a later time to check for new releases or other selections that may be more to their liking. One advantage that can be realized in queue monitoring embodiments of the present invention is the fact that this requirement of overloading by the subscriber (which takes time) is avoided because the system automatically ensures that his/her preference queue is never allowed to completely run "dry" so to speak.

As can be seen in second display area 111, Subscriber Selection Queue 110 contains a number of rows which identify particular subscriber selections, and a number of columns which provide unique information about a particular selection. As an example, in row 112, a subscriber selection is associated with the following queue control information: (1) a selection priority indicator (a numerical ranking within the queue to indicate where the title ranks in sequence to be shipped); (2) a selection title (in this case DDD); (3) a selection availability (in this case indicating that the title is available at this time); (4) and a selection type (in this case, the letter "P" indicating that the subscriber personally selected the title). In contrast, for example, a selection 112' indicates that the selection was automatically selected for the subscriber by the present system (by the letter "A" designation). In some embodiments, an additional designation (such as an * for example) can be used to designate those titles which have been automatically selected (or reserved) but not yet finally approved (or confirmed) by the subscriber. Thus, this serves to designate a form of tentative selection.

Another characteristic of such systems is the fact that while a first title may be prioritized by the subscriber higher than a second title in the Subscriber Selection Queue 110, this does not mean that the first title will be shipped first. This is because, in many cases, the systems are configured so that if the first title is not yet available, the next title after this is examined to see if it is available instead. Thus, if possible, the system attempts to ship "a" title to the subscriber. A limitation of this, of course, is that the subscriber can sometimes be left with only titles that are unavailable, or which have a long wait. In such instances, again, the subscriber is not satisfied, because there is an inordinate amount of time between deliveries. The present invention can accommodate for such problematic scenarios, as well, both by informing the subscriber of such scenarios, and by further taking proactive steps to remedy the logjam (as explained below in connection with the exchange mechanism).

It will be appreciated, of course, that this is merely exemplary media selection information, and other information could be provided on an as-needed or as-desired basis. Furthermore, it will be understood by those skilled in the art that while movies are used as an example, other items can be easily incorporated within an electronic interface 100 of the present invention, and that the nature of the interface will of course vary according to the type of media item presented.

Queue Control Options display area 115 is unique to the present invention. This field identifies a set of subscriber queue control options in place for a subscriber, as well as links to additional features by which the subscriber can add or modify such options. Thus, as shown, an exemplary set of subscriber queue control options 116 indicate that the subscriber wishes that a queue monitor system monitor the Subscriber Selection Queue 110 and with controls such that:

1. when his/her queue is completely empty (i.e., there are no titles left in Subscriber Delivery Queue 116 to be moved to a Titles Out Queue 106);
2. a notice will be sent indicating such fact, and a new title will be automatically shipped (or distributed).
3. the selection of the title should be automatically recommended by the service provider) based on prior ratings provided by the subscriber for other films Other options will be discussed below, and it will be understood that this is simply an example of the many different types of setups that could be used by a subscriber.

A queue control setup link 117 is provided (i.e., using a highlighted link within the web page 100) to allow a subscriber to alter or modify subscriber queue control options 116 through the use of an additional web page (shown below in FIG. 2). A legend area 118 provides a notice to the subscriber that an additional (optional) fee may be charged for selections that are automatically shipped in this fashion.

Finally, an electronic avatar 120 is further provided to interact and assist the subscriber with features of the queue monitoring system of the present invention. Since some aspects of the invention may be foreign or unfamiliar to certain types of subscribers, it may be desirable to include some human like interaction in such cases. In this instance, electronic avatar 120 is generally referred to and designated as a "Queue Keeper" to denote to subscribers that (as with a "zoo" keeper for example) another entity is attentive, responsive and mindful of their preferences and desires as concerns movie selections, and is working on their behalf behind the scenes so to speak to effectuate their wishes and desires. Avatar 120 can take on a variety of customized appearance desired by the user in accordance with well-known techniques. In some incarnations avatar 120 can also provide visual feedback to a user by way of facial expressions (frowning, smiling, etc.) to respond to user input. The avatar can in turn communicate to a user both by text, audio output, etc.

Again, other examples of the fields discussed above will be apparent to skilled artisans as simple design choices based on the particular characteristics of the display being used, and the type of media being rented. Furthermore, to better illustrate the features of the present invention, other aspects of interface 100 have been omitted, and it will be understood that such interface could include other options, features, entries, etc., that are not specifically shown. Finally, as will be apparent to skilled artisans, it is possible in home video recorded/satellite receiver systems that interface 100 (and the other interfaces described herein) will be generated and driven by a menu program within such systems, and not by connection of a browser to a WWW page per se.

Notification, Shipping and Recommendation Preference Setup

Figure 2:
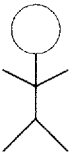
FIG. 2 is an illustration of a queue control electronic interface employed in the present invention that is adapted for assisting users/subscribers to set up queue monitoring control parameters, queue notification parameters, queue replenishment parameters and other queue control options.

FIG. 2 illustrates a queue control electronic interface employed in the present invention that is adapted for assisting users/subscribers to set up queue monitoring control parameters, queue notification parameters, queue replenishment parameters and other queue control options. It will be understood, of course, that many of these display areas/fields could be integrated as desired into queue status interface 100 as well if desired.

As can be seen herein, a queue monitoring system can be configured to be extremely active, mostly passive, or something in between, all the subscriber's control. Furthermore, all or most of these services/features can be monetized if desired by a service provider to enhance profitability as well as customer satisfaction.

Accordingly, a first preference display area 210 provides a short description of the reasons and functions associated with the queue monitoring system to interested subscribers. A preliminary question is posed to the subscriber, such as, for example, whether they want to employ the benefits of auto queue monitoring, auto notifications, auto recommendations, auto shipments, etc. At this point, if the subscriber wishes to simply elect certain default values (shown in shaded form in the interface) he/she simply selects a FINISHED field 295, and the choices indicated by such shadings would then be stored for such subscriber. If the user prefers not to use a queue monitoring logic feature, they can depress the CANCEL field 296 and return to the prior interface.

Alternatively, assuming that the subscriber wishes to select their own customized controls, they then interact with and select from a number of selection areas within interface 200. The nature of the questions and selections posed in such interface areas is preferably designed to allow even less experienced computer users to glean the meaning of the options presented.

In some instances, as suggested earlier, the service provider may want to charge a monthly fee for such monitoring services, as well as additional fees for each title that is reserved or shipped. In other instances, a service provider may provide the monitoring service free of charge (or particular selections free of charge) based on a subscriber's service level, and/or maintaining a level of average turnaround time that is below a certain threshold. In other words, if a subscriber routinely receives and returns titles within a few days, this practice helps in managing inventory and in spreading out/satisfying demand for media inventory, particularly popular titles. Thus, in contrast to many brick and mortar enterprises which punish late rentals with penalties/fees, the present invention in fact attempts to reward early rental returns with various incentives. Accordingly as this type of behavior can be rewarded, including through non-monetary considerations such as the services described herein, this further enhances the useability and marketability of a service provider system configured as described herein.

Thus in a second preference display area 220, a so-called queue trigger threshold question is first posed to the subscriber. In other words, "when" should the queue monitoring logic review Subscriber Selection Queue 110? As seen in this area of interface 200, the subscriber is given four threshold options, including generally the following: (1) when the Subscriber Selection Queue 110 becomes completely empty (i.e., as a result of moving the last selection into Titles Out Queue 106); (2) when the number of remaining titles in Subscriber Selection Queue 110 falls below a certain number (selectable by the user) of movies left; (3) when a desirable selection is available at the service provider (as determined by certain auto-recommend logic described herein); (4) at certain predetermined (selectable by the user) time intervals—i.e., every day, every week, etc. Some of these options are not mutually exclusive, and, therefore they can be selected in tandem of course. Other options may be employed, as well, depending on the nature of the media, subscriber preferences, etc.

Threshold Option #1 (default) of course is the least "proactive" of course, but still serves to accomplish the goal of reducing the chances that the Subscriber Selection Queue 110 will become completely empty. In some instances it may be desirable to incorporate a "swap" feature, for example, that operates as a last minute check. Thus, when the system detects that the last selection to be moved into Titles Out Queue 106 is less desirable than another selection that is available, the user can opt for the better selection to be shipped instead (either automatically, or through an email confirmation), thus avoiding a wasted shipment, wasted time, etc. In another variation the user can also set up a limited response period (i.e., 1 day) so that if he/she does not reply favorably to the new choice, the original choice is shipped as planned to avoid delays.

Threshold Option #2 gives additional flexibility for a variety of reasons. First, if there are lesser desirable selections remaining, these can be supplemented by (or even swapped out for) better selections before the former are actually moved into Titles Out Queue 106 for shipment. Furthermore, in some instances it may be desirable for the system to compare user selections (which may be identified in a queue with a high priority) against automatically recommended selections (which may be identified with a lower priority but predicted to be more "desirable" to the subscriber) to see if the latter should "bump" the former in shipping priority. Again, this serves to improve the overall user experience by ensuring that better quality selections are actually shipped and received.

Threshold Option #3 is useful for ensuring that the Subscriber Selection Queue 110 is continually updated with better or fresher selections to supplement those that might be present in the queue. For example, if a new release comes out that is likely to be of interest, the user is not required to physically log on to the site, look for, review or study the particular selection. Instead, the system automatically determines this for the subscriber, and adds the same to his/her Subscriber Selection Queue 110. In some instances, an additional control could be added to make sure that these types of selections are merely designated as "tentative" until the subscriber accepts them into his/her selection queue. Again, since this feature acts as a form of "reserve" it is possible that the service provider could associate a fee for such preferential treatment. Furthermore it may be desirable to automatically move such popular selections into the Titles Out Queue 106 to ensure that they are quickly received, seen and returned by the subscriber for use by other subscribers.

Threshold Option #4 replaces the typical user experience of logging on every day, week, month, etc., to check for titles, and is useful as an additional check for the subscriber to make sure that any interesting selections have been considered. Again, in some instances, and particularly where third party monitoring services are used, a nominal fee could be associated with "checking" the Subscriber Selection Queue 110.

A third preference display area 230 is used to specify options for "what" the system should do when the so-called triggering threshold is met. Again, these notification selections can vary from very simple directives, to very detailed instructions, and it will be understood that what is shown in FIG. 2 is merely exemplary of what can be provided.

Notification Option #1 indicates that only a notification should be sent to the subscriber when the triggering threshold is reached. Preferably this information is sent electronically to ensure expedient receipt by the subscriber. For instance, a simple e-mail, text message or instant message could be used. In other instances a hard-copy regular mail notice could be sent as well. The content/substance of a preferred notification is discussed below in connection with FIG. 3A.

Notification Option #2 indicates that a notification should be sent to the subscriber when the triggering threshold is reached, and that an additional media title should be automatically selected (and if necessary shipped), without further prompting or feedback from the subscriber. This option may be desirable by some types of subscribers who do not wish to be bothered with the task of selecting titles. An additional reminder field can be associated with this option, so the subscriber can indicate how often he/she should receive notices. This is useful so that if the Subscriber Selection Queue 110 is not replenished within a certain time frame, the subscriber can receive another notice.

In response to the subscriber selecting Notification Option #3, the system will skip any official notification to the subscriber, and simply select a new title to be inserted into Subscriber Selection Queue 110 or Titles Out Queue 106. Again, this option may be of interest to certain subscribers who prefer not to receive additional emails.

Notification Option #4 gives the subscriber more control, in that a notification is sent, but it specifically directs the system NOT to actually move a title into Subscriber Selection Queue 110 (or Titles Out Queue 106 as the case may be) until an actual or "constructive" confirmation is obtained. An actual confirmation would require, for example, that the subscriber either visit the site to remove a tentative designation, confirm the shipment in a later e-mail, etc. A constructive confirmation can be based on time, for example, so that the system will automatically remove any tentative designation (if such exists) and move or ship the title within a predetermined (controlled by the user) number of days.

A fourth preference display area 240 is used to specify options for "how" the system should replenish or supplement the Subscriber Selection Queue 110. Again, these replenishment/addition options can vary significantly according to the type of media, other system features, etc., and it will be understood that what is shown in FIG. 2 is merely exemplary of what can be provided.

In the present invention, the service provider preferably automatically recommends a title to be included in Subscriber Selection Queue 110/Titles Out Queue 106. A variety of artificial intelligence, or preference determination systems are known in the art for predicting preferences of individuals. These systems work based on such simple factors as demographics, prior selections, expressed preferences, questionnaires, etc.

In the present system, an auto-recommend feature can be based, for example, on prior ratings given by a subscriber to certain movies which he/she has seen, and/or just based on the identity if all prior rentals. In this instance, the system uses prior ratings by default, as these tend to more accurately reflect a particular individual's tastes. However, the invention is by no means limited to any particular mechanism, and it will be understood that any suitable system can be employed for this purpose. The only criterion, of course, is that recommender should work in the background, seamlessly and without extensive burdensome participation by the subscriber so that the queue is automatically replenished.

Additional replenishment options are based on various categories of selections available at the media service provider. Thus, a subscriber can ask that any automatic selection be restricted to one or more particular categories, such as a New Release, a particular genre, a particular collection, from the top 100 most popular choices, from a Critic's choice selection, etc. Again, additional fees may be identified and collected for New Releases or other categories of titles. Other examples will be apparent.

Finally, a fifth preference display area 250 provides additional levels of queue management control. For example, in response to a Queue Management Option #1, a subscriber can elect to have any new automatically selected title "bump" the next to be shipped item in the Subscriber Selection Queue 110. In some instances, additional sub-control features can be employed so that the new automatically selected item "always" bumps such existing queue item, or only does so when it is of a higher preference for the particular user. Again, this type of feature can be used to further improve the overall experience by the subscriber, who is then ensured to receive media that is more tailored to their particular tastes. Alternatively, a Queue Management Option #2 can be selected, in which case the auto recommended title is simply placed in the order in Subscriber Selection Queue 110 behind any other existing entries. In such instance, the item will be shipped automatically after the other entries are shipped, unless the subscriber specifically vetoes such selection either during a notification process, or manually later by visiting the site on his/her own.

In yet another (optional) Queue Management Option #3, a subscriber can elect to have entries moved into Subscriber Selection Queue 110 and simply designated as tentative. In such cases, these types of titles are NOT automatically shipped unless the subscriber specifically requests such action at a later time. Thus, any such entries can essentially float in the queue until they are given a non-tentative status. This allows for subscribers to further designate a class of selections for which they are not entirely sure that they want shipped, but which can wait in abeyance in the queue until they are confirmed. Again, to ensure that subscribers make fair use of such system, it may be desirable to charge a fee for any title that is reserved in this fashion, and even if it is not actually shipped.

As a final note, it will be understood by those skilled in the art that at least some of the options presented in the Threshold, Notification, Replenishment and Management are related to each other, and that additional selection logic would be employed to make sure that the subscriber elects options in such areas that are consistent with each other. Thus, for example, if the subscriber selects Notification Option #3 (autoship without notice) they will NOT be presented with Queue Management Option #3, to avoid a conflict in the management logic. To avoid such possibilities, the system can selectively enable and disable options between display areas based on the user's selections. Other examples will be apparent to those skilled in the art.

The final fields in interface 200 represent standard FINISHED 270 and CANCEL 271 operations. If the user is done providing his/her preferences, the FINISHED field 270 is activated, the preference data is saved, and the user is taken back to Interface 100. If the user merely selects CANCEL 271, no changes are saved.

Again, it will be understood from the present description that preference interface 200 shown in FIG. 2 is merely exemplary, and that any particular commercial implementation is likely to deviate from the same. Furthermore, it is not necessary to include all the options indicated, and other options could be substituted in lieu of the same. Accordingly, the final look of any interface is expected to be a matter of routine design skill based on particular needs of a particular media service provider and their respective subscribers.

Electronic Notification, Confirmations & Feedback

An exemplary notification message 300 in accordance with the present teachings is shown in FIG. 3A. As noted earlier, this message is preferably an email based text/graphics message with embedded links that can be clicked through by a recipient. For example, as seen in FIG. 3A, a notification message header 310 contains basic identifying information, including a sender field, recipient field, and a byline field. An optional graphical character can be included to associate message 300 with a queue keeper.

A first message notice field 320 includes information pertaining to a basic notice that would be elected pursuant to Notice Option #1 or #2 above. This would also be sent after a period of time that exceeds a subscriber default confirmation time as provided in Notice Option #3 above. Again, the description provided in FIG. 3A is merely exemplary, and any suitable form can be used for the notice. An additional optional clickably URL could be embedded in the message to permit the subscriber to see the status of their particular Subscriber Selection Queue 110. A further optional field could identify, by title, an additional selection already preselected for the subscriber to consider for inclusion in their Subscriber Selection Queue 110 when he/she visits the media service provider site.

In the event the subscriber has elected some kind of autoship feature as well from the configuration options above, the message 300 can include an additional second message ship field 330. This field provides details on the title of the automatically selected item for the subscriber, and an approximate shipping date for the same. Again, optional clickable URLs are embedded in the message to permit the subscriber to see more information about the item in question.

An additional feedback link field 335 causes an additional feedback window to open for the subscriber to provide his/her feedback on the quality of the selection made by the queue monitoring logic. This can be implemented in any conventional fashion, using numerical rankings, sliders, etc. The feedback data can be tabulated to monitor the performance of the queue monitoring logic, to compile user preferences, etc.

A confirmation field 340 provides an opportunity for a subscriber to opt-out of receiving the preselected item. A clickable URL link is thus provided for the user to change or cancel the particular selection.

Figure 3C:
FIG. 3C depicts an embodiment of a typical email confirmation screen provided to a subscriber in accordance with the teachings of the present invention.
Figure 3C:

FIG. 3B illustrates yet another example of a confirmation-request type notice 300 which may be sent in accordance with selecting notification option #3 above. In this type of notice, a user is informed of the fact that a queue monitoring system has identified a title that he/she may be interested in, and a specific request for feedback is made to confirm acceptability of the choice. Thus, in the body of such message, a subscriber is given essentially the same information as for the message of FIG. 3A, except that a click through to a specific URL is made to cause the subscriber to interact with an interface shown in FIG. 3C. As shown in FIG. 3C, a subscriber can then elect to have the item shipped, not shipped, or even have the title modified for another selection. Again, an optional ratings field can then be employed to solicit feedback on the performance of the system for monitoring purposes, for updating a subscriber profile, for use by a recommender system, etc.

It will be understood by those skilled in the art that the above are merely examples of a type of notification that can be sent to subscribers. The precise format, wording and style will be a matter of design choice for any particular application, and the invention is not limited by the same. Again, the primary advantage of the present invention lies in the fact that, unlike the prior art systems, a subscriber is notified of the deficiency in his/her selection queue, and is thus given an opportunity to address the same in a prompt fashion.

Furthermore, an ancillary benefit to the service provider is that they can determine, from available inventory, particular titles which may be of interest to subscribers, and ship them as a way of "filling" subscriber queues in advance. This can be done, again, by auto-recommender systems, such as by the Cinematch system employed by Netflix, or other comparable system. In other words, every title preemptively shipped by the service provider acts to supplant a subscriber choice that may be harder to satisfy (i.e., because the desired title is scarce). For example, if the service determines that a customer is highly likely to enjoy title A, if the subscriber agrees to select title A, and if the title is shipped to the subscriber, this fills an available spot in the Titles Out Queue 106 and reduces the expectation/opportunity by the subscriber of receiving another (potentially more popular) title. This further frees up an opportunity for the service provider to ship the more popular title to another subscriber, thus giving more flexibility in responding to demand. Furthermore, a service provider can determine which titles have a higher profit margin (i.e., lower sharing expenses with distributors, studios, etc.) and control the distribution of titles more closely using cost/profit as an additional factor as well.

Finally, it should be noted that this type of proactive inventory management helps to expand the reach and desirability of the system to other types of would-be renters, including persons who are too busy, lazy, or unable to determine appropriate choices on their own. Moreover, since some renters are impulsive, they can be presented automatically with title choices to increase their participation rates as well.

In other circumstances, a notice can be sent automatically to those subscribers (i.e., without a setup process by a subscriber) upon determining that their rental selection queue only contains titles that are unavailable (or subject to a long wait). In those instances, again, it is preferable to alert a subscriber to such fact before an undue amount of time passes, and so the subscriber (and/or the system) can take some form of corrective action.

Of course, from a customer satisfaction perspective it makes no sense to send a title that is likely to be undesirable to a subscriber, so it is imperative to select good alternative choices, and this practice must be tempered to some extent. Furthermore, it may be desirable, in some instances, to not impose a fee for an automatic recommendation if the title in question is not particularly popular, or based on the subscriber's status (i.e., if he/she is a preferred customer, has a certain subscription level, etc.) Nonetheless, it should be apparent that the monitoring logic of the present invention can operate to spread out demand for popular titles, while achieving a greater degree of customer satisfaction, and increasing reach of the service provider to other audiences.

Operation of the Preferred Embodiment

Figure 4:
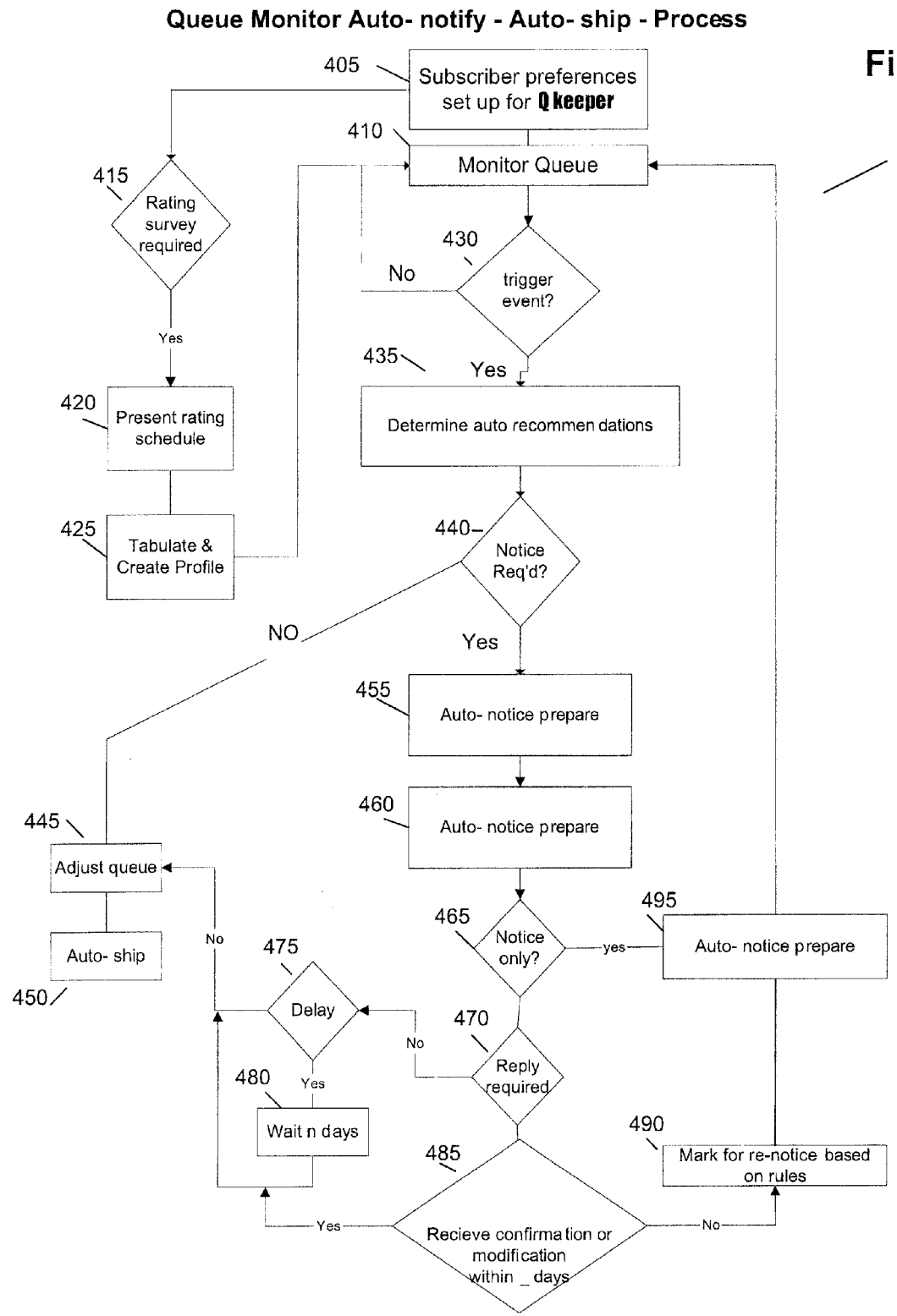
FIG. 4 illustrates a preferred process employed in a preferred embodiment of a queue control system of the present invention.

A preferred Auto-Notify/Auto-Ship process 400 used by a media distribution system with intelligent queue monitoring configured in accordance with the present inventions is illustrated in FIG. 4. Again, as noted herein, such process is expected to be embodied in a variety of software programs, routines, etc., that run on one more servers coupled to the Internet. In other embodiments these programs and routines will run directly on a computing machine at the subscriber's premises, such as a digital video recorder, receiver, etc.

As a first step, a subscriber configures his/her preferences as noted in step 405, including the various options noted above in connection with FIG. 2. In the event that a ratings survey is determined at step 410 to be necessary from the subscriber (i.e., there is insufficient information for a recommender system to generate a meaningful recommendation for a title) this is effectuated at steps 415 (present ratings schedule) and 420 (tabulate profile) at which time a preliminary preference profile is created and maintained thereafter for the particular subscriber. As noted below, recommender systems are well-known in the art, and the present invention can thus be used with any number of suitable implementations. The present invention enhances the value of such recommender systems, in fact, by more proactively "pushing" valuable, interesting and high profit margin titles to subscribers in an optimal location along the distribution chain. Furthermore, in some implementations a recommender system can further consider a title popularity, a subscriber status, a subscriber turn-around time for titles, etc., before finalizing a particular choice, to ensure that a title is appropriate and/or cost-effective for a particular subscriber. As an example, a very popular new release may be recommended only to certain kinds of subscribers who routinely return titles quickly.

After such initialization steps, a queue monitoring procedure is performed in a loop-like fashion at step 410, again, in accordance with the directives selected by the subscriber, and/or in conduction with other instructions from a service provider. If no triggering event is detected at step 430, the system returns back to a monitoring mode.

When a triggering event is detected, the system then generates an auto-recommended title at step 435 for the particular subscriber using the subscriber's preference profile. A preliminary preference profile is obtained as noted above, and is supplemented later, of course, with additional feedback from the user and observation of user selections.

A number of conventional and customized programs can be configured for performing this type of task; for example, Netflix uses a system identified as Cinematch for such purpose. Other alternatives are of course acceptable, and could be used with the present system to ensure a title that is likely to be of interest to the subscriber. Again, in some embodiments, the system may merely alert the subscriber to the queue deficiency without generating a recommendation, or, at least, the latter operation may be performed after such alert.

At step 440, a determination is made to see if the subscriber is supposed to receive a notice or not. Again, in some instances, for simplicity, a subscriber may opt out of further notifications and simply elect to receive the recommended title.

In such case, as noted at step 445, the Subscriber Selection Queue 110 is updated, or, if necessary, at step 450, the Titles Out Queue 106 as well (in the event the subscriber's queue was completely empty and the title should be shipped). The title is then shipped to the subscriber in a conventional fashion as practiced in the prior art. Again, as noted above, in some instances a nominal fee can be associated with such activities to reflect the benefits conferred on the subscriber. Finally, in some instances, it is possible that before moving the title to a Titles Out Queue, the subscribe may elect to barter and/or exchange the title with another subscriber in return for additional inducements or consideration.

At step 455, if the subscriber has elected to receive a notification, the substance of a message (such as illustrated in FIGS. 3A and 3B) is prepared. The auto-notification message is then sent, (preferably) electronically, at step 460, using any conventional delivery mechanism, such as email, text message, wireless alert, etc.

At step 465, if the notification consists solely of a notice (pursuant to the subscriber's request) the process branches to step 495, where a notation is made for the subscriber's profile that the subscriber was indeed notified. Control then returns to the queue monitor step 410; as noted earlier, a notice can be resent if the subscriber has elected such option.

At step 470, if the notification does not require an affirmative reply confirmation, then the subscriber's preferences are examined to see if he/she has elected for a predetermined delay period at step 475. In other words, this procedure determines if the subscriber has asked for a constructive confirmation option in the form of a certain number of days. If the answer is no, the process proceeds to step 445 and continues as noted above. If the answer is yes, then a delay period is introduced at step 480 equal to the subscriber's request, and thereafter the process picks up step 445 as before.

In the event the user has opted for an actual confirmation (as opposed to a constructive confirmation) the process then moves to step 485. At this point, the system determines whether it has received actual confirmation, or if the user has canceled or modified the selection. If yes, the system shifts to step 445 as noted earlier. If no, the system updates the subscriber profile to indicate that a notice was sent, and initiates a re-notification process 490 to be executed at a later time to remind the subscriber if need be.

At this point, a designation (such as an *) can be made to the particular title as it is sitting in the Subscriber Selection Queue 110, so that if the subscriber logs on to view his/her account, they will understand immediately that the automatically selected title is merely tentative. In a preferred approach the subscriber can elect to remove the designation directly at the service provider website through interface 100, rather than wait for another email notification/confirmation.

It will be understood by those skilled in the art that the above is merely an example of an auto-notify/auto-ship process for a media distribution system, and that countless variations on the above can be implemented in accordance with the present teachings. A number of other conventional steps that would be included in a commercial application have been omitted, as well, to better emphasize the present teachings.

In addition, the present invention could be extended to perform additional administrative functions as well, such as determining optimal service plans for subscribers. By monitoring the levels of subscriber queues, and the frequency at which they are replenished by subscribers, the system can provide recommendations to subscribers on an optimal service plan. For example, for full-service subscribers who rarely check out more than 1 title at a time, a notification (email) could be sent to suggest that they alter their service plan to a lesser service. Similarly, for lower service subscribers who appear to have large numbers of titles in their Subscriber Selection Queue, a notification could be sent to suggest that they upgrade their service. Other examples will be apparent to those skilled in the art. This type of feature will further allow a service provider to determine an appropriate service plan for each subscriber, and thus improve overall customer retention rates.

Subscriber Preference Procedure

Figure 5:
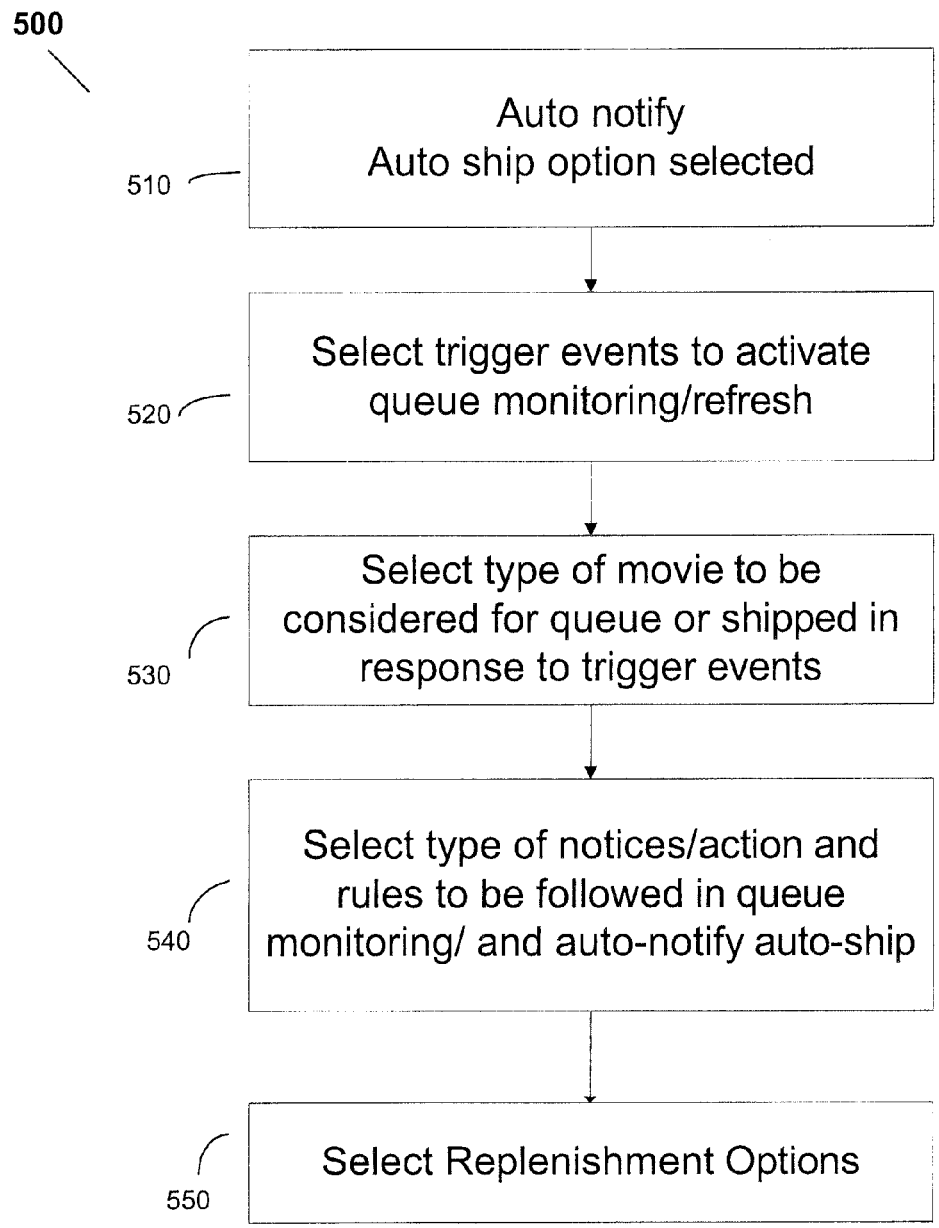
FIG. 5 illustrates a preferred process utilized in a preferred embodiment of a subscriber queue control set up system of the present invention.

A preferred subscriber preference setup process 500 used by a media distribution system with intelligent queue monitoring configured in accordance with the present inventions is illustrated in FIG. 5. Again, as noted herein, such process is expected to be embodied in a variety of software programs, routines, etc., that execute within a conventional user browser program.

Thus, as seen in FIG. 5, a subscriber enables an Auto-Notify/Auto-Ship process at step 510. Thereafter, the subscriber either elects a number of default values, or begins the process of configuring particular parameters to be used in a queue monitoring system. For example, at step 520, the "trigger events" are provided by the subscriber, to identify when the monitoring logic should examine the subscriber's selection queue. At step 530, the subscriber identifies what type of movie (or other media format) he/she wants to be considered for an auto-recommendation system. At step 540, the subscriber identifies specifically what type of policies/rules should be employed—i.e., what notice and action should be sent to him/her, including the Notification Options described earlier. Finally, at step 550, any other additional management options (such as a sequence for placement of automatically selected features) are provided.

It will be understood by those skilled in the art that the above is merely an example of an auto-notify/auto-ship configuration process for a media distribution system, and that countless variations on the above can be implemented in accordance with the present teachings. A number of other conventional steps that would be included in a commercial application have been omitted, as well, to better emphasize the present teachings.

Subscriber Profiling Procedure

Figure 6:
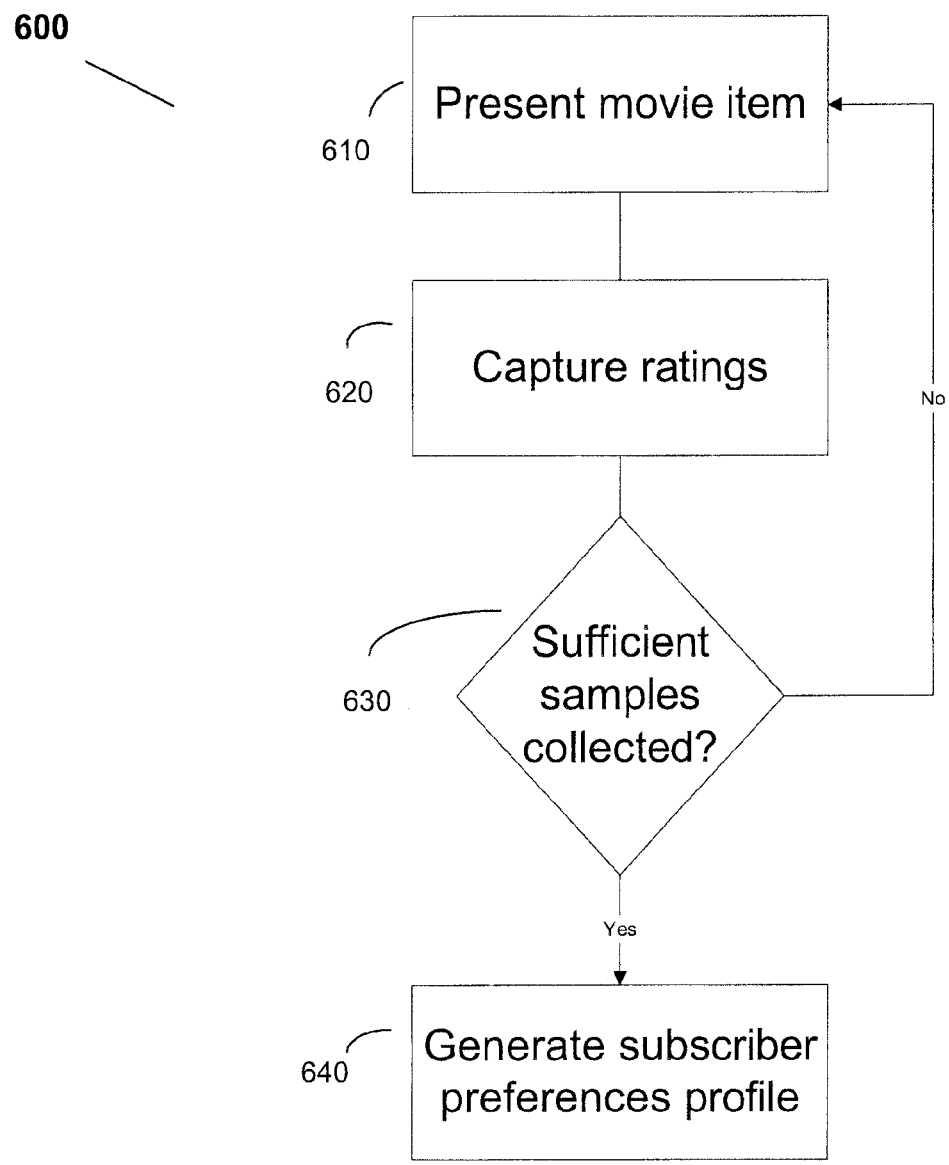
FIG. 6 illustrates an exemplary process for generating a recommendation profile for a subscriber suitable for use in the present invention.

A preferred subscriber profiling process 600 used by a media distribution system with intelligent queue monitoring configured in accordance with the present inventions is illustrated in FIG. 6. Again, as noted herein, such process is expected to be embodied in a variety of software programs, routines, etc., that execute within a conventional user browser program.

As seen in FIG. 6, a subscriber is presented with a movie "survey" application, to collect data on a subscriber's tastes in movies. Thus, at step 610 an interface showing one or more movie titles, and an entry field for the subscriber to provide a rating is provided. The movie titles can be selected for presentation based on an evaluation by the system of movies most likely to have been by the subscriber, movies that are rated most popular by other subscribers, movies that have been determined to provide the best discrimination in tastes between subscribers, etc. Again, the particular logic used to provide the sample list will be a function of the particular recommender system employed. Additional fields for providing short summaries of the movies could be provided as well. The movies could appear in a list, a table, or as a sequence of separate pages. The precise format of the interface is unimportant, of course, and could be implemented in a variety of ways known in the art.

At step 620, the ratings are captured for the movies presented. Again, it is expected that the subscriber may not provide sufficient information on enough movies to form an intelligent profile, and, if so, the process would branch at step 630 to prompt for more information. In the event the subscriber does provide sufficient profiling data, a preliminary subscriber preference profile is generated at step 640. This preliminary subscriber preference profile is changed or supplemented later, of course, in response to additional feedback from the user and as interpreted by a recommender system (not shown).

As before it will be understood by those skilled in the art that the above is merely an example of a subscriber profile capture process for a media distribution system, and that countless variations on the above can be implemented in accordance with the present teachings. A number of other conventional steps that would be included in a commercial application have been omitted, as well, to better emphasize the present teachings.

Furthermore, in some instances, a preliminary subscriber preference profile might be generated simply based on demographics information presented by the subscriber, or some other data presented by the subscriber, without the use of a formal survey. In other instances the preferences data can be set to some default value based on average subscriber behavior, thus obviating the need for any formal data collection process. Again, the precise mechanism by which a profile is obtained is irrelevant, so long as a recommender system is able to make an intelligent prediction on a likely title choice of interest to the subscriber.

Structure of the Preferred Embodiment

A preferred embodiment of a media distribution system 700 with intelligent queue monitoring that is constructed in accordance with the present inventions is illustrated in FIG. 7. The system is composed of several components including a Network 702, through which a number of separate Network Connections 704 are provided to a Service Provider Server Device 720 by a plurality of Customer Network Devices 712. It will be understood by those skilled in the art that other components may be connected to Network 102, and that not all connections shown need to be active at all times. There are also several software components associated with the aforementioned network-connected devices, including an Item Search/Selection Module 721, a Media Processing/Shipping Module 722, and a Subscriber Delivery Queue Module 723, a Recommender Module 724, and a Subscriber Profile Module 725. These software components are essentially the same as those found in a prior art system, except they may be modified appropriately to cooperate with the new software components of the present invention, including an Intelligent Queue Monitor module 726, a Subscriber Queue Control Module 727, a Queue Status Notification Module 728 and a Feedback System 729.

Network 702 is preferably the Internet, but could be any implemented in any variety of commonly used architectures, including WAN, LAN, etc. Network Connections 704 are conventional dial-up and/or network connections, such as from analog/digital modems, cable modems, satellite connections, etc., between any conventional network device and an Internet Service Provider in combination with browser software such as Netscape Navigator, Microsoft Internet Explorer or AOL. In a satellite media distribution system implementation, Client Device 712 is a satellite receiver, a TIVO receiver, or the like, and an interface to a service provider does not require a browser.

Delivery/return path 705 represents a physical or electronic route for delivering and returning a particular title to/from a subscriber. Again, in a preferred embodiment, the media title is a movie in DVD format that is shipped in a specialized mailer package by any conventional means to a subscriber, such as US Postal Service, courier, etc. In other applications, as noted herein, Delivery/Return path 705 can be an electronic link (broadband preferably) for delivering content of a media item to a subscriber.

In most applications, Customer Network Device 112 will be typically desk top computers, laptop computers, personal digital assistants (PDAs), cell phones, or some form of broadcast receiver (cable, satellite, DSL). Server Network Device 110 is typically a network server. Of course, other structures and architectures may be more suitable on a case by case basis for any particular implementation of the present inventions, and so the present inventions are not limited in this respect.

Software elements of the present invention typically will be custom tailored for a particular application, but preferably will include some common features, including the following.

Operating on System Network Device 720 are the following software routines and/or supporting structures, which implement a form of media distribution. First, an Item Search/Selection Module 721, contains a list of media items (i.e., movies, books, CDs, etc.) available on the network organized and searchable by Title, Artist and other attributes as determined by customer popularity, system administrative requirements, and the like. This module also presents a conventional query interface (not shown) to subscribers to allow them to peruse and view information about the media items.

A Media Processing/Shipping Module 722 supports and controls each subscriber transaction that takes place within system 700, including updating subscriber accounts, updating subscriber queues, etc. in response to a subscriber selection of a particular title. Thus, this module acts as a form of administrator to coordinate interactions with subscribers, to show them the status of their accounts, etc. It also generates any appropriate internal directions required to effectuate a shipment of a particular item to a particular subscriber by a shipping department (which may be physically separate from a site at which device 720 is located).

A Subscriber Delivery Queue Module 723 controls and updates subscriber delivery queues in response to subscriber selections, automatic return and shipping instructions issued by Media Processing Module 722 (such as when a title is returned) and based on a Intelligent Queue Monitor module 726 described below.

A Subscriber Profile Module 724 analyzes subscriber inputs, queries, title selections, title deliveries, etc., and forms a customized interest profile for each subscriber. This can be done in accordance with the overall process flow illustrated in FIG. 6, or based on any other conventional method. This customized subscriber-specific information is in addition, of course, to any other basic customer-specific information that may be maintained, such as authorized user names, account numbers, physical addresses, credit card information, etc.

Based on such information in the subscriber profile, a Recommender Module 725 operates to provide suggestions for additional titles that are likely to be of interest to the subscriber. These can also be provided within a standard query interface presented by Item Selection/Search module 721. Again, a variety of such types of recommender systems are well-known in the art and can be incorporated within embodiments of the present invention. For example, a well-known system is the Cinematch program used by Netflix; other acceptable turn-key or custom solutions could be used. The title suggestions may be provided while the user is engaged in an interactive session across network 702, or, as explained above, even while the user is not connected to Service Device 720. The benefit of the latter feature, of course, is that a subscriber delivery queue can be updated even without direct ongoing participation by the user, who may be too busy to engage in a session to locate more titles. In such latter case, the recommendations are solicited by a Subscriber Queue Control module in accordance with user directives and are used by a Queue Control Monitor 726 to replenish/modify/update a subscriber delivery queue 723.

An Intelligent Queue Monitor module 726 is responsible for monitoring/updating a subscriber delivery queue 723 in accordance with the directives noted above in FIG. 2 and FIG. 4 and performs the functions noted in the same. This module coordinates with Media Processing System 721, Recommender Module 725 and the modules noted below to ensure that a subscriber's wishes concerning a particular title and queue management are actually performed. This module (or alternatively Feedback Module 729) further causes any appropriate additional billing module to update a user account and debit any charge associated with an automatic recommended/shipped title as noted above.

Subscriber Queue Control Module 727 is responsible for generating the interfaces noted in FIGS. 1, 2, interacting with a subscriber to obtain subscriber auto-notice/auto-replenish/auto-ship options, and implementing other associated functions noted in FIGS. 4 and 5. This information is passed on and used by Intelligent Queue Monitor module 726 to effectuate the actual control of subscriber delivery queues 723, and to Queue Status Notification Module 728 to ensure that such module also interacts properly with subscribers.

Queue Status Notification Module 728 is responsible for generating the message notifications illustrated in FIGS. 3A, 3B (in response to subscriber queue control information solicited by Intelligent Queue Monitor module 726) and maintaining administrative information concerning such notifications in accordance with the directives provided by a user in the interface of FIG. 2, and the overall operation noted in FIG. 4. For instance, it will note when a subscriber has been notified and cause a re-notification to be sent if necessary within a predetermined time period.

A Feedback Module 729 coordinates with Queue Status Notification Module 728 to notify users in accordance with their queue control selected options. This module also solicits the subscriber feedback noted above in connection with FIG. 3B, and of course functions to notify Intelligent Queue Monitor module 726 of user acceptances of titles (or changes) selected by the latter. This feedback information is also passed on to Recommender Module 725 and subscriber profile module 724 so that the latter can be updated. By capturing this feedback, the Recommender module's 725 performance can be improved and enhanced for later subscriber recommendations.

A subscriber exchange module 730 helps to implement a subscriber exchange system, described in more detail below in connection with FIG. 8. Similarly, an auto-exchange module 731 implements an automated exchange system for controlling inventory, improving user satisfaction, etc. as detailed below in connection with FIG. 9.

It will be apparent to those skilled in the art that the modules of the present invention, including those illustrated in FIG. 7 can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a large portion of the hardware and software of FIG. 7 will be contained locally to a subscriber's receiver, such as in the case of a user receiving media items through direct electronic distribution.

It will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art.

Subscriber Based Exchange/Bidding for Titles

As seen in FIG. 8, another aspect of the present invention concerns an auction or subscriber based exchange system (as noted by reference numeral 730 in FIG. 7) for allowing subscribers to compete for and/or reserve certain media titles in a form of media title exchange system. For example, to improve service and profitability, a media service provider may elect to place a certain limited number of popular titles into a kind of auction/exchange queue. This (optional) function allows subscribers to improve their chances of seeing a popular but scarce title, and can be used either in conjunction with the queue monitoring system described above, or as a stand-alone system. Since many Internet users are familiar with online auction features, there is at least some percentage of the subscriber base who are likely to find such option interesting and useful in their experience with the service provider.

In a strict sense, the present embodiment can be considered an exchange system rather than an auction system, because the primary interaction is based on bids and offers that can be accepted immediately by subscribers, as opposed to a pure auction system which typically employs a competitive bidding process over a predefined period. Nonetheless, it will be apparent to those skilled in the art that the present invention can use elements of both approaches, and thus be used in both an exchange embodiment, a pure auction embodiment, and mixed embodiments. Thus, as used below, it should be understood that the term "exchange" could be substituted with the term "auction" without deviating from the focus of the present teachings.

In this particular instance the inducement and cost of participating in the media title exchange can be either monetarily based, rights (access) based, service based, or a combination of the same. For example, a "bid" can be paid for by a subscriber with a nominal fee, or in exchange for that subscriber releasing another popular title from his/her Subscriber Selection Queue 110 back to the service provider or to another subscriber as consideration.

In a preferred embodiment, only a subset of the titles is given this type of treatment, but it will be apparent that the concept could be extended in embodiments that include inventory that is entirely exchange-driven. Furthermore it will be apparent that in some instances it will be desirable to have a certain inventory number of the same media title both in a regular inventory pool and in an exchange pool. For example, the most current release of an action film may have 10 copies in a regular inventory pool that can be selected by subscribers, and another 10 copies in an exchange inventory.

This subset of inventory can be described generally as "exchange items" in that their deployment from the provider to subscribers is primarily (if not exclusively) done on an exchange and/or auction basis. This designation can be used until such time as the title essentially loses its cachet as an exchangeable/auctionable item because there is essentially little competition for its use.

Thus, in a first step 810 as shown in FIG. 8, a media service provider (or even a third party monitor) designates a certain set of titles as exchange media items. Thereafter, at step 820 when a subscriber/requester wishes to select a particular title in the set of exchange media items, the system checks to see if one is available. An item may be "available" as a result of there being at least one uncommited copy of the pool of exchange media items that is not outstanding in a Titles Out Queue or already in a Subscriber Selection Queue 110. An item may also be "available" if an existing subscriber has a copy in a Subscriber Selection Queue 110, and is willing to part with the same for some negotiable consideration.

If a title is available because it is uncommitted, the requester can elect to reserve the title into his/her Subscriber Selection Queue 110 at step 825. Again, a nominal fee and/or additional consideration may be requested from the subscriber as a prerequisite to obtaining the title. In the latter case, the system may require relinquishment of another popular title from Subscriber Selection Queue 110. Other examples will be apparent to those skilled in the art.

At step 830 if a title is available as a result of at least one subscriber having a copy in a Subscriber Selection Queue 110 that he/she is willing to part with, then the requester is given the details of any reserve/offer information that the copy holder(s) has/have identified with the copy. For example, the holder(s) may indicate that they want a copy of another title in exchange, or a certain number of "credits" from the requester. The credits in this case can consist of additional services from the service provider, such as a free auto-recommendation title provided in accordance with the discussion above, or even additional capacity (such as in the form of an additional slot in their Titles Out Queue 106).

At step 840 the requester can then elect to consummate an exchange with a subscriber for one of the copies in question, by agreeing to the terms offered by the subscriber. As will be apparent, this process can be done either directly at the website through an additional interface, through an email exchange, or any other suitable method known in the art. The system 700 (FIG. 7) then makes appropriate adjustments of the respective Subscriber Selection Queues, account balances, credit balances, etc. at step 845.

At step 850, if the title is not available, the user is prompted to see if he/she wishes to place a "bid" for the item to be considered at a later date by the system when a copy does become available. Again, the "offer" in this case can consist of a nominal fee that is preset by the system or adjustable by the user, and is collected at step 855. As noted earlier, in lieu of monetary fees, the system can also allow subscribers to bid using various forms of service credits, electronic coupons, etc. Alternatively, the user can be prompted to determine if they are willing to offer an item in their existing queue as consideration. In some instances, of course, a combination of the same could be used, or other inducements as well. Furthermore, in some cases a requester can elect to have email notifications sent to him/her when a copy of a particular exchange item becomes "available" as noted above.

In step 860, persons who have successfully secured a copy of an exchangeable title can opt to associate an asking bid for the item, if they want to participate in an exchange system for the title. The particular details of the asking bid, including any financial component, credit component, or title exchange component can be provided using any well-known interface at step 865.

Note that in some instances, as part of step 810, it may be desirable to allow subscribers to "move" items from a regular pool of items to an exchange pool if they are willing to do so. This, again, allows a degree of flexibility to subscribers to help them acquire titles to their liking. Such items may be thus be tagged temporarily with an exchange label, and/or be permanently identified thereafter by the system as exchange items.

In addition it may be desirable in some instances for system 702 through Exchange Routine 730 (FIG. 7) to monitor the extent and nature of barterings/swaps between subscribers to glean additional information about their tastes, desires, etc. This exchange data can be used for determining inventory requirements (i.e., if a particular title seems to be in demand), suggesting changes in subscriber account levels (i.e., if a particular user seems to be needing more capacity), or predicting success/capacity requirements of future titles that may be included in inventory to reduce demand uncertainty. Furthermore, by studying the general form of bids and acceptable offers, the system can learn from the collective subscriber base what precisely constitutes an acceptable level of inducement that can be offered to secure titles (see below FIG. 9).

The routines for implementing the exchange operations as described above can be implemented using any conventional software programs and routines available to skilled artisans, and the present invention is not limited to any specific embodiment thereof.

Futhermore, it is expected that such routines will vary from computer to computer in actual commercial practice. To better illustrate the features of the present invention, other aspects of the exchange system have been omitted, and it will be understood that such system could include other options, features, entries, etc., that are not specifically shown.

Auto Exchange/Bidding for Titles

In another variation, the service provider can incorporate automatic exchange features, built on the principle of identifying and measuring relative subscriber interest in particular titles, in addition to or in lieu of the subscriber exchange system of FIG. 8. This process is depicted generally in FIG. 9 and describes generally the operation of a routine 731 (FIG. 7).

The exchange system can operate either on an entire inventory of a service provider, or only a subset. For example, it may be useful to only actively exchange certain types of popular titles, or only for certain types of subscribers. In addition, the auto-exchange system can operate primarily on a titles based driven strategy, or a subscriber based strategy. In other words, the system can be instructed to work from a set of popular titles to re-allocate their deployment in a cost effective, customer friendly fashion. Alternatively (or in addition to) the system can be instructed to identify subscribers who are likely to be unhappy, frustrated and/or likely to cancel their service as a result of not obtaining an appropriate number of titles within their subscription period.

Thus in FIG. 9 at step 910, assuming title A is a popular article, the exchange system determines if a first subscriber has title A listed in his/her Subscriber Selection Queue 110; it also examines what listed ranking it is given—in this case, position X.

At step 920, the system determines that a second subscriber also has title A listed in his/her Subscriber Selection Queue 110 but in position Y, where Y indicates a much lower priority than X. In other words, from these rankings it is apparent that the second subscriber ascribes a much lower subjective value than the first subscriber in obtaining title A.

At step 930 an access ranking for title A is determined for both subscribers. While it is shown in this sequence, again, it will be understood that this step could be done during or before steps 910 and 920.

The access ranking is derived from the service provider processing the respective requests for this title in a type of "first to request" fashion (or some other fashion), so that the second subscriber is earmarked to receive title A before the first subscriber; i.e., the second subscriber has a higher access ranking. For example, the second subscriber made the request a month ago, while the first subscriber has just made their request. The "access ranking" is used herein generally to refer to the overall priority which a particular user has for obtaining access rights to an item. Thus, as an example, if 100 subscribers desire title A, and no free copy of such title is available, such subscribers could be provided with rankings from 1-100 to designate the relative priority by which they are to secure eventual access to a returned copy of such title. In some instances the positions provided by the subscribers for the titles may be ignored in favor of only looking at the access rankings. Other variations are equally useable with the present invention, and it is by no means limited in this respect.

Thus, at step 940, an automatic exchange system of the present invention monitors such occurrences and provides a notification/alert to the second subscriber indicating the potential for "swapping" access rankings.

At step 945, assuming the first subscriber is willing to provide consideration to the second subscriber in exchange for the improvement in access ranking rights, the swap is consummated, and the system would then update the respective queues of the two subscribers.

In another variation, in lieu of a second subscriber engaging with the first subscriber at step 940 (or in addition to), the automatic exchange system would instead step in and barter for the parties at step 960. This would be done, for example, as part of an inventory management operation, such as if the system determined that the second subscriber has a significantly longer turnover time than the first subscriber. In other words, the system can do a primitive form of "capacity" planning by determining demand and allocating the resource (a title) in a more efficient matter so that it can be enjoyed by the greatest number of subscribers. For example, if subscriber #2 keeps movies out twice as long as subscribers #1 and #3, the overall customer satisfaction factor can be improved by providing the copy in question to subscribers #1 and #3 during a time period in which otherwise only subscriber #2 would receive the copy. The system would provide various staged inducements automatically to the second subscriber, in a manner akin to that used by airlines to convince fliers to give up their seats when they have overbooked a particular flight.

In another approach, and as noted earlier, the system can operate from a subscriber perspective to identify potential customer problems caused by a stock-out situation. Thus, the system may consider if the titles in a particular first subscriber selection queue are all designated as "long wait," meaning that the first subscriber is unlikely to receive an actual title anytime soon. In such instances the system may elect to increase an inducement to another second subscriber (who may have titles out) to ensure that the first subscriber does not become frustrated or disenchanted with the service provider. In general, from a customer satisfaction perspective, it is desirable to always have at least one title of interest in the possession of the customer, and to reduce stock-out of particular titles for such customer. By identifying potential "weak points" the system can preempt and reduce customer defections by preventing stock-out.

For example, the system may first offer a free autorecommendation "credit" to the second subscriber in exchange for swapping (or giving up entirely) their access ranking. In other instances, an additional slot in a Titles Out Queue may be provided, to give the subscriber an opportunity to have more titles out at a time for a limited period. The level of inducements could be tied directly to the access ranking that the first subscriber has for the particular title. Thus, if the subscriber is about to receive the title because he/she is next in line and a copy is available, this access right has higher value than a later in time access ranking. In some instances the subscriber may in fact no longer care about the title, because they have changed their mind, already seen the selection, or prefer to receive service credits instead. By giving them an opportunity to barter in essence with the automatic exchange system, overall user satisfaction can be increased because more subscribers are getting what they want. In other instances the degree of inducement could be a function of the relative status of subscriber #1 and subscriber #2, so that, again, higher service clients and/or are exceptionally quick turn-around clients may be the subject of larger inducements.

Again, as noted earlier, by observing the behavior and bargains consummated by the subscribers on their own for particular titles, a system can learn and identify what types of offers are likely to be acceptable to induce a particular subscriber to release a particular title. In some embodiments, an auto-exchange system may in fact announce (at the service provider web site, or through emails) that it is offering capacity slots (i.e., additional slots int the Titles Out Queue) to subscribers in exchange for relinquishing a particular title from their rental selection queue. In some cases the consideration can be provided to any persons who also physically "return" a copy of such title. The return could be conditionally credited even before the title is returned, in some cases, by the subscriber identifying that the title has been mailed back. The credit could then become final upon confirmation of receipt of the title from the subscriber. Again, other alternatives will be apparent from the present teachings.

If the second subscriber accepts the inducement, the access rankings for the titles are swapped, and their queues are updated, as seen in step 945. If the second subscriber does not accept, the system can simply quit, or look for another possible third subscriber who presents a reasonable match for the first subscriber. An additional confirmation could be sent to both subscribers, as well. This feature has the benefit of seamlessly and transparently improving a subscriber's choices in a manner that is likely to be appealing to "prompt" customers, while still being acceptable and fair to less responsive or timely customers.

It can be seen that this aspect of the invention provides a form of revenue sharing at the subscriber level, to complement any additional normal revenue sharing that is embodied in the original purchase of the media item from the supplier. By determining a potential "cost" associated with obtaining a title from a first subscriber, and comparing it to a potential "benefit" from a second subscriber, the present invention can identify useful exchange points and maximize an overall profitability for the service provider.

In other instances, the level of inducement may reach so far as to (temporarily) provide the second subscriber with an additional "slot" in their Titles Out Queue in exchange for a popular title desired by a first subscriber. In other words, the cost to a service provider in granting another Titles Out Queue slot (temporarily) to one subscriber is, in most cases, much less than that of a losing another subscriber.

Alternatively the system could allow a situation in which two subscribers could even agree to a similar deal; i.e., that they can exchange capacity by (temporarily) adding one slot in a first subscriber's Titles Out Queue at the expense of a slot in a corresponding queue of a second subscriber. This may be attractive to those subscribers who do not typically use all of their shipping capacity, and do not need more than a limited number of titles at a time, and conversely to those subscribers who may temporarily wish to receive an additional title beyond their normal rate structure.

Based on the above teachings, other variations of exchanges, inducements, etc., will be gleaned by skilled artisans. Again, the auto-exchange system may be used of FIG. 9 can be used in paired with exchange system 800, used in conjunction with the queue monitoring system described above, used as a stand-alone system, etc.

The routines for implementing the automatic exchange operations as described above can be implemented using any conventional software programs and routines available to skilled artisans, and the present invention is not limited to any specific embodiment thereof. Futhermore, it is expected that such routines will vary from computer to computer in actual commercial practice. To better illustrate the features of the present invention, other aspects of the exchange system have been omitted, and it will be understood that such system could include other options, features, entries, etc., that are not specifically shown.

Variations of the Invention

In other related embodiments of the present invention, the queue monitoring logic will be part of a separate web site, and operated by an entity separate from the service provider and the subscriber's selection and delivery queues. In other words, a subscriber to a media provider may pay a separate service provider for the privilege of having the latter monitor a delivery queue. This concept is used, for example, in other Internet related service applications, such as in the case of AuctionSniper (or Bidnapper), which, as is well-known, assists buyers on EBay to secure auctions. Thus, a subscriber to a media provider would simply provide the pertinent details of their account to a monitoring service provider, and the latter would effectuate the steps above automatically on behalf of the subscriber on a periodic basis, or some other basis. Again, these third parties could collect a monthly flat fee, and/or additional fees depending on the number of titles actually "reserved" or shipped on behalf of the subscriber. The benefits of such third party services, of course, is that they can be better tailored by the subscriber to obtain desirable selections from a particular media provider, because the latter may not be economically incentivized to maximize the number and quality of selections provided to an individual subscriber. Moreover in many instances such third party services are better suited for aggregating collective needs of subscribers and responding to the same, because they are not limited to a single service provider. In other words, a single queue monitor system could service multiple online service providers, thus allowing its users to benefit from a larger population of preference and interest data.

In other applications of the invention, a similar monitoring system could be employed in other online service provider environments. For example, for electronic auction sites, a queue monitor and recommender system could cooperate to locate additional items of interest to a buyer, based on prior purchases, or based on other items already located in a so-called "auction watch" type tool set up by the subscriber. Such "watch" queues are used, for example, on Ebay. The user could then be (optionally) notified by email that the additional item has been added to his/her auction watch. When the user returns for a subsequent online session, the newly added auction items could be highlighted, for example, to draw his/her attention to the new item. Again, the queue management could be set up based on various threshold options, such as whether the system has located another item of interest, or if the user's auction watch no longer has items (because the auctions have expired). Thus, a queue monitoring system can work behind the scenes for users of auction systems as well, and further enhance value of such services.

As alluded to earlier, the invention has application in actual retail environments as well, particularly in cases where media is sold on a similar basis—i.e., a fixed number of items for a flat fee per period. Again, these are but examples, and other applications of the invention will be apparent to those skilled in the art.

Furthermore, while the media items in the present instance represent one format in which a movie can be distributed, it will be apparent that other distribution schemes can be used as well. For instance, a movie may be distributed by a satellite channel, and/or a broadband channel to a receiver. In the latter cases, the Subscriber Selection Queue 110, the Titles Out Queue 106 (and several other hardware and software modules of FIG. 7) may be located physically on a home receiver/player owned/rented by the subscriber. For example, a service offered by DirecTV and Tivo allows users to "rent" movies temporarily from a pay-per-view menu, and/or to record the same on a fixed storage system at the user's facility. These organizations could also offer a service similar to that offered by online DVD rental providers by charging a flat monthly rate for unlimited selections. While the issue of capacity (in the Titles Out Queue) may be somewhat irrelevant in some such environments (because the subscriber's hard drive can store a significant number of titles, and there is little delay in receiving the title) the present invention could similarly operate to review a subscriber's selection queue, make recommendations, and replenish a Subscriber Selection Queue with suggestions. Furthermore, in some cases, a subscriber's receiver may be limited to a certain number of movies, in a manner akin to the Titles Out Queue concept. The only difference, of course, is that these titles are typically delivered in accordance with a predetermined time schedule, as opposed to an on-demand type system, and there is no "return" required per se. When a subscriber has seen one of the movies in his/her Titles Out Queue (or analog thereof) the system gives the subscriber the option of "returning" the title (by deleting it for example) and receiving another one in its place. While the Tivo service presently does perform some auto-recommendation functions (such as automatically recording programs) it does not do so in the context of programming that must be paid for, (such as pay-per-view items) and does not restrict a user's recording of movie titles (i.e. to a certain predefined limit). Thus the systems and methods of the present invention can be easily applied to such movie distribution environments as well.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of allocating capacity delivery of playable media items over between a first user of a media distribution service and a second user of the media distribution service, the method comprising:
    (a) providing a first delivery queue for the first user with a computing system accessible over an electronic network, said first delivery queue having a first capacity for delivering playable media items to said first user;
    wherein said first capacity defines a first maximum number of said playable media items which can be in a delivered state to the first user at any time;
    (b) providing a second delivery queue for the second user with said computing system, said second delivery queue having a second capacity for delivering second playable media items to said second user:
    wherein said second capacity defines a second maximum number of said playable media items which can be in a delivered state to the second user at any time;
    (c) exchanging capacity between said first subscriber queue and said second delivery queue for delivery of playable media items with said computing system in response to a request received from one or both of said first user and second user over said electronic network;
    wherein said first capacity and said second capacity are altered such that a respective first maximum number and second maximum number of playable media items which the first user and second user are able to have in their respective possession at any time is also altered.

2. The method of claim 1, wherein said request represents a confirmation of an agreement between said first user and said second user.

3. The method of claim 1 wherein a combined capacity of said first delivery queue and said second delivery queue remains constant after step (c).

4. The method of claim 1 wherein said playable media items include movie titles stored on a digital disk.

5. The method of claim 1, wherein said playable media items are delivered electronically over a broadband channel.

6. The method of claim 1 wherein said capacity is exchanged temporarily for securing a single additional playable media item.

7. The method of claim 1, where said capacity can be exchanged in the form of individual delivery slots.

8. The method of claim 1, further including a step: monitoring exchanges of capacity with said computing system for at least one of the following purposes: (a) determining demand for titles; (b) identifying potential user account changes and providing information to a user about a proposed change to the user account; (c) predicting success/capacity requirements of future titles.

9. The method of claim 1, wherein capacity exchanges are identified and performed automatically on behalf of said first user and/or second user over said electronic network based on identifying users receiving fewer numbers of titles during a subscription period.

10. A method of allocating capacity delivery of playable media items over between a first user of a media distribution service and a second user of the media distribution service, the method comprising:
    (a) providing a first delivery queue for the first user with a computing system accessible over an electronic network, said first delivery queue having a first capacity for delivering playable media items to said first user;
    wherein said first capacity defines a first maximum number of said playable media items which can be in a delivered state to the first user at any time;
    (b) providing exchange information for a portion of said first capacity, which exchange information can be reviewed over a network connection by a second user to the media distribution service;
    wherein said exchange information identifies an amount of consideration required for said first user to obtain said portion of said first capacity;
    (c) providing a second delivery queue for the second user with said computing system, said second subscriber delivery queue having a second capacity for delivering second playable media items to said second user;

wherein said second capacity defines a second maximum number of said playable media items which can be in a delivered state to the second user at any time;

(d) receiving a request over the network connection from said second user to locate additional capacity for delivering said playable media items;

(e) offering said portion of said first capacity to said second user in accordance with said exchange information associated with said first media title;

(f) providing said portion of said first capacity to said second user in response to said second user consenting to provide said consideration;

wherein capacity for delivering playable media items can be exchanged between said second user and said first user under control of said media distribution service;

further wherein said first capacity and said second capacity are altered such that a respective first maximum number and second maximum number of playable media items which the first user and second user are able to have in their respective possession at any time is also altered.

11. The method of claim 10 wherein a combined capacity of said first delivery queue and said second delivery queue remains constant after step (c).

12. The method of claim 10 wherein said playable media items include movie titles stored on a digital disk.

13. The method of claim 10, wherein said playable media items are delivered electronically over a broadband channel.

14. The method of claim 10 wherein said capacity is exchanged temporarily for securing a single additional playable media item.

15. The method of claim 10, where said capacity can be exchanged in the form of individual delivery slots.

16. The method of claim 10, further including a step: monitoring exchanges of capacity with said computing system for at least one of the following purposes: (a) determining demand for titles; (b) identifying potential user account changes and providing information to a user about a proposed change to the user account; (c) predicting success/capacity requirements of future titles.

17. The method of claim 10, wherein capacity exchanges are identified and performed automatically on behalf of said first user and/or second user over said electronic network based on identifying users receiving fewer numbers of titles during a subscription period.

18. A method of automatically allocating capacity delivery of playable media items over between a first user of a media distribution service and a second user of the media distribution service, the method comprising:

(a) providing a first subscriber delivery queue for the first user with a computing system accessible over an electronic network, said first subscriber delivery queue having a first capacity for delivering playable media items to said first user;

wherein said first capacity defines a first maximum number of said playable media items which can be in a delivered state to the first user at any time;

(b) receiving a request for a first playable media item from said first user over said electronic network;

(c) automatically locating a second user with access rights to said first playable media item using said computing system;

wherein said second user has a second delivery queue with a second capacity defining a second maximum number of said playable media items which can be in a delivered state to the second user at any time;

(d) automatically changing capacity of said first subscriber delivery queue and/or a second subscriber delivery queue for a second user using said computing system in exchange for securing access to said first playable media item for said first user;

wherein said first capacity and said second capacity are altered such that a respective first maximum number and second maximum number of playable media items which the first user and second user are able to have in their respective possession at any time is also altered.

19. The method of claim 18, further including a step: receiving an indication of a consideration required by said second user for obtaining access rights to said first playable media item.

20. The method of claim 19 further including a step: causing the computing system to automatically negotiate on behalf of the first user for said access rights.

21. The method of claim 1 wherein said playable media items are taken from a subset of inventory offered by the media distribution service, which subset represents titles automatically determined by the computing system to be popular.

22. The method of claim 1 wherein said playable media items are taken from an inventory offered by users of the media distribution service holding access rights to such items.

23. The method of claim 1 wherein said playable media items include a subset of inventory for a first title which is designated for an exchange program, while other inventory of said first title is not included in said exchange program.

24. The method of claim 1, wherein capacity exchanges are identified and performed automatically on behalf of said first user and/or second user over said electronic network based on identifying users likely to cancel a subscription.

\* \* \* \* \*